(12) United States Patent
Keller, Sr.

(10) Patent No.: US 7,618,608 B1
(45) Date of Patent: Nov. 17, 2009

(54) AEROGEL AND METHOD OF MANUFACTURING SAME

(75) Inventor: Robert R. Keller, Sr., Bedford, NH (US)

(73) Assignee: Keller Companies, Inc., Manchester, NH (US)

( * ) Notice: Subject to any disclaimer, the term of this patent is extended or adjusted under 35 U.S.C. 154(b) by 700 days.

(21) Appl. No.: 11/301,724

(22) Filed: Dec. 13, 2005

(51) Int. Cl.
*C01B 33/12* (2006.01)

(52) U.S. Cl. ........................ 423/338; 423/335

(58) Field of Classification Search ........................ None
See application file for complete search history.

(56) References Cited

U.S. PATENT DOCUMENTS

| | | | |
|---|---|---|---|
| 3,872,217 A | | 3/1975 | Merz et al. |
| 4,443,357 A | | 4/1984 | Maloney et al. |
| 5,686,031 A | | 11/1997 | Coronado et al. |
| 5,698,140 A | | 12/1997 | Lamb et al. |
| 5,795,556 A | * | 8/1998 | Jansen et al. ................ 423/338 |
| 5,795,557 A | | 8/1998 | Pajonk et al. |
| 5,879,744 A | | 3/1999 | Cao et al. |
| 5,922,299 A | | 7/1999 | Bruinsma et al. |
| 5,942,553 A | | 8/1999 | Biesmans et al. |
| 6,068,882 A | | 5/2000 | Ryu |
| 6,156,386 A | | 12/2000 | Schwertfeger |
| 6,172,120 B1 | | 1/2001 | Smith et al. |
| 6,210,751 B1 | | 4/2001 | Schwertfeger |
| 6,258,305 B1 | | 7/2001 | Brinker et al. |
| 6,300,385 B1 | | 10/2001 | Hashida et al. |
| 6,315,971 B1 | | 11/2001 | Wallace et al. |
| 6,344,240 B1 | | 2/2002 | Menon et al. |
| 6,447,991 B1 | | 9/2002 | Daitch et al. |
| 6,485,805 B1 | | 11/2002 | Smith et al. |
| 6,598,283 B2 | | 7/2003 | Rouanet et al. |
| 6,670,402 B1 | * | 12/2003 | Lee et al. .................... 516/111 |
| 6,740,416 B1 | | 5/2004 | Yokogawa et al. |
| 6,764,667 B1 | | 7/2004 | Steiner, III |
| 2004/0132846 A1 | | 7/2004 | Leventis et al. |
| 2006/0084707 A1 | | 4/2006 | Ou et al. |

OTHER PUBLICATIONS

Loftus, K.D., Silica Aerogel Process Modeling and Experimental Investigations, Dissertation, University of California at Berkeley, Dec. 1989, University Microfilms International (Ann Arbor, MI), pp. 9-10, 16-18, 136-137, 140-141, 157, 166, 210, and 216-217.*

* cited by examiner

*Primary Examiner*—Melvin C Mayes
*Assistant Examiner*—Smita Patel
(74) *Attorney, Agent, or Firm*—Davis & Bujold, P.L.L.C.

(57) ABSTRACT

An ambient pressure, low cycle time method for the synthesis and manufacture of a low cost, highly insulting, highly translucent, and low density transition metal-based hydrophilic and hydrophobic nanogel. The important aspects are the method of synthesis, the stage of imparting hydrophobicity, and the process of manufacture. The method comprises the steps of mixing a chilled precursor solution with a chilled catalyst solution such that the mixture has a pH of between 9.5 and 12.2. The mixture is maintained at a temperature of 34° F.-55° F. for between 1 and 120 minutes to form a gel. The gel is silated the gel for about 120 minutes, washed in a wash fluid, then dried and annealed to form the aerogel.

20 Claims, 15 Drawing Sheets

Constant-Temperature Stirred Tube Reactor (CSTR)
High-Transparency Silica Aerogel Manufacture Via Vapor Phase Reaction Process Constant-Temperature Stirred Tube Reactor (CSTR)
High-Transparency Silica Aerogel Manufacture Via Vapor Phase
Reaction Process Condensed Acoustic Trace Detailed Acoustic Trace

Kalgel-Doped Insulation

(RAH: Reinforced Angel Hair)

Baseline (Undoped) Insulation

(RAH: Reinforced Angel Hair)

Transmission Curves for Selected Aerogels

Table I

| Property | KALGEL-1105 | Xerogel |
|---|---|---|
| Clarity (C), μm/cm | 0.0041 | 0.217 |
| Surface Scattering Coefficient (A) | 0.807 | 0.5515 |
| Light Transmittance, % | | |
| By itself/Artificial Light | 40 | 26 |
| By itself/Blue-sky Day | 26 | 17-18 |
| Kalwall Panel/Artificial Light | 28 | 19-20 |
| Kalwall Panel/Blue-sky Day | 21 | 12-13 |
| Thermal Insulation (R) | 18.4 | 13.6 |
| Velocity of Sound, m/s | 489.7 | 1377.4 |
| Weathering Resistance | | |
| Actinic Degradation (ΔE) | Excellent (0.21) | Excellent (0.31) |
| Moisture Resistance | Excellent | Poor |
| Moisture Uptake, % | 0.017 | 219 |
| Ozone Resistance | Excellent | Slight Fading |
| Resistance to Chemicals | | |
| Weak Acids | Excellent | Excellent |
| Strong Acids | Excellent | Good |
| Weak Basis | Excellent | Excellent |
| Strong Basis | Excellent | Excellent |
| Solvents | Insoluble | Swellable |
| Packing Performance, Kg/m³ | 35.76 | 153.78 |
| Bulk Modulus, GPa | 0.73 | 0.44 |
| Durometer Hardness (Type A) | 52-63 | 45-50 |
| Resistance to Settling | | |
| Vibration Filling | Very Good | Excellent |
| Transportation Vibration (71°C) | Very Good | Excellent |
| Transportation Vibration (25°C) | Very Good | Very Good |
| Transportation Vibration (-30°C) | Very Good | Good |
| Density, g/cc | | |
| Hg | 0.0919 | 0.7143 |
| He | 0.0322 | 0.2330 |
| Dimensions, mm | Granule | |
| D | N/A | 3.9 |
| L | | 10.5-107 |

Fig. 7

Experimental Setup for Aerogel Modulus of Elasticy Measuremet

Alcogel → Aerogel

Solvent Removal

Hydrogel Silation Process

AEROGEL AND METHOD OF MANUFACTURING SAME

FIELD OF THE INVENTION

The present invention relates to an efficient method for rapidly producing silica aerogel by rapid solvent exchange, inside wet gels, with little water, alcohol and acetone produced as the reaction byproducts. Preferably, dynamic frequencies are induced throughout the gel mass/continuum, during the aging and washing processes, in order to enhance, and thus accelerate, diffusion throughout the nanoporous gel structure.

BACKGROUND OF THE INVENTION

The formation of aerogels, in general, involves two major steps, the first is the formation of a sol-gel like material, and the second is drying of the sol-gel like material to form the aerogel. In the past, the sol-gel like materials were made by an aqueous condensation of sodium silicate, or a similar material. While this process works relatively well, the reaction forms salts within the gel that need to be removed by an expensive ion exchange technology, and repetitive washing, thereby rendering this process time consuming, expensive, and laborious. With the recent development of sol-gel chemistry over the last few decades, a vast majority of silica aerogels prepared today utilize silicon alkoxide precursors. The most common of these are tetramethyl orthosilicate (tetramethoxysilane (TMOS) $Si(OCH_3)_4$), and tetraethyl orthosilicate (tetraethoxysilane (TEOS) $Si(OCH_2CH_3)_4$). However, many other alkoxides, containing various organic functional groups, can be used to impart different properties to the gel. Alkoxide-based sol-gel chemistry avoids the formation of undesirable salt byproducts and allows a much greater degree of control over the final product. The balanced chemical equation for the formation of a silica gel from TEOS, by a standard methods is:

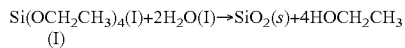

$$Si(OCH_2CH_3)_4(l)+2H_2O(l) \rightarrow SiO_2(s)+4HOCH_2CH_3 \quad (I)$$

SUMMARY OF THE INVENTION

The present invention is directed to an improved silica aerogel product and an improved method for preparing the silica aerogel product. The improved silica aerogel product can be one of a granule, a coating, a hybrid composite, or a monolith, in which the byproduct of reaction is almost always alcohol—with negligible amounts of water—and in which the time required to perform solvent extraction and drying typically ranges from 2-16 hours per batch, as opposed to the standard ambient process time of about 120-200 hours per batch, for example.

Aerogels are chemically inert, highly porous ceramic materials. Generally, these materials are produced by forming a gel which contains a solvent. Once the solvent is removed, a porous solid component is formed. Removal of the solvent, while still preserving the porous solid structure, can be a difficult process because the gel often shrinks upon removal of the solvent and this causes the porous solid structure to collapse, thereby leaving an optically transparent material with a relatively small surface area and low pore volume, referred to as "Zeolite." This obstacle is overcome by utilizing a solvent which promotes hydrolysis of the alkoxides in the presence of a catalyst, specifically a base catalyst and more specifically a silane-based catalyst (namely, gamma-APTES) gamma-aminopropyl triethoxysilane, and generates alcohol as the primary reaction byproduct. In so doing, the duration of the washing process is significantly reduced while, at the same time, the structural integrity of the alcogel is significantly enhanced. Concurrently therewith, silation (—OH capping) of the alcogel may be carried out almost immediately after the initial or first gel point is attained (within 10-50 minutes or so) or while gelation is attained, but while self-assembly is in progress.

Recent advances in this technology have produced—currently only in laboratories,—aerogels that are the product of a sol-gel process, whose final stage involves extracting the pore-filling solvent with an organic liquid, at ambient pressure. The end product is a very low density solid (e.g., having a density of between 0.003-0.25 grams/cm$^3$), with the same volume as the original hydrogel and a chemical composition substantially identical to that of glass.

A sol-gel technique has been developed by Keller Companies, Incorporated, and this technique is used to prepare wet gels in ethanol, more specifically in diacetone alcohol, inside a jacketed glass-lined reactor or a stainless steel vessel, that are suitable for aging and subsequent silation, washing and drying. The process generally takes between 2-16 hours to produce a final product, however, depending on specific characteristics of the aerogel, the process may be completed in about 3-4 hours or so.

The length of drying time of the aerogel is dependent upon the pore size, the particle size distribution, the tortuosity of the pores and the thickness of the aerogel sample being prepared, since it is the thickness, i.e., the largest dimension of the aerogel sample being prepared, that determines the distance required for heat and mass diffusion during the drying process. The time required for solvent exchange varies approximately proportionally to the square of the sample thickness.

The present invention focuses on reducing the overall processing time for preparing a high quality silica aerogel. The present invention focuses on specific reactants and their byproducts. Specifically, the use of a diacetone alcohol solvent eliminates the need for water as the hydrolyzing media for the alkoxide precursors which, in turn, reduces the processing time.

It is an object of the present invention to substantially reduce the synthesis time required for ambient pressure drying of wet gels to form the silica aerogel product.

It is a further object to produce aerogel products in a minimum amount of time while reducing the solvent-particle contact angle, and thereby avoiding particle collapse.

It is a still further object to produce an aerogel product while maintaining the temperature within the wet gels sufficiently spatially uniform in order to avoid thermal stress damage within the skeletal structure of the gel.

It is a further object to produce an aerogel product while maintaining the fluid surrounding the wet gels at substantially the same temperature and pressure as the fluid within the wet gels.

This invention further relates to an aerogel synthesis process with a significant reduction in the synthesis time.

Yet another object of the invention is to maintain narrow temperature and pH ranges for the mixed reactants to optimize the particle size distribution, the optical clarity, the light scattering coefficient, and/or the density of the aerogel product, depending upon the particular application for the end product.

Additionally, the present invention relates to the use of a diacetone alcohol (DAA) solvent, and the elimination of water as a hydrolyzing media for the synthesis process.

The present invention further relates to the use of ethanol solvent in combination with ammonium hydroxide to form a catalyst solution, where the catalyst solution is reacted with the precursor solution, which is a combination of ethanol solvent and an alkoxide, and more specifically tetraethyl orthosilicate (TEOS).

Also, the present invention relates to the use of carbamaldehyde (formamide) solvent in combination with ammonium hydroxide to form the catalyst solution, where the catalyst solution is reacted with the precursor solution, which is a combination of carbamaldehyde (formamide) solvent and an alkoxide, and more specifically tetraethyl orthosilicate (TEOS).

Also, the present invention relates to the use of carbamaldehyde (formamide) solvent in combination with gamma-APTES to form the catalyst solution, where the catalyst solution is reacted with the precursor solution, which is a combination of carbamaldehyde (formamide) solvent and an alkoxide, and more specifically tetraethyl orthosilicate (TEOS).

Also, the present invention is directed at using (dynamic) frequencies throughout the gel continuum as a mechanism for enhancing diffusion of the solvent and thus reduce the processing time. Diffusion is enhanced as a result of an increase in the effective mass and heat diffusion rate at the solvent (e.g., hexane, heptane, etc.)-fluid (e.g., alcohol, water) interface.

The present invention is further directed at the use of carbamaldehyde as an evaporation controlling agent, which acts as a morphology stabilizer for the lattice structure of the silica nanogel, thereby reducing the external thermal stress which prevents, or minimize at the very least, collapse of the nanostructure of the porous silica aerogel.

Additionally, the present invention relates to the use of more efficient and compatible catalysts such as ammonium hydroxide, and gamma-aminopropyl triethoxy silane (gamma-APTES). Ammonium hydroxide is an efficient catalyst which, upon reaction, leaves no ionic species and thus leads to the formation of a high translucency hydrogel. Gamma-aminopropyl triethoxy silane is a high performance silane-based catalyst and a coupling agent, referred to as gamma-APTES. This catalyst is added to the solvent solution ($H_2O$/EtOH) in an amount of about 0.01% to 5% by weight of the precursor (e.g., alkoxide). The catalyst gamma-aminopropyl triethoxysilane has the formula $(NH_2)(CH_2)_3 Si(OC_2H_5)_3$ while ammonium hydroxide has the formula $NH_4OH$.

The present invention also relates to a method of manufacturing a silica aerogel, the method comprising the steps of: a) preparing a precursor solution chilled to a temperature of between 20°-60° F. (−6.7°-15.5° C.); b) preparing a catalyst solution chilled to a temperature of between 20°-60° F. (−6.7°-15.5° C.); c) mixing the chilled catalyst solution with the chilled precursor solution to form a mixed solution with the mixed solution having a pH of between 9.5 and 12.2; d) aging the mixed solution for a time of between 1 and 120 minutes, to form a gel and control a particle size distribution of the gel while maintaining the mixed solution at a temperature of between 34°-55° F. (1.1°-12.8° C.); e) immediately upon the mixed solution reaching a gel point, silating the gel for a time period of between 1 and 120 minutes; and f) drying the gel at a temperature of at least 122° F. (50° C.) to form the aerogel.

The present invention finally relates to an aerogel manufacture by: a) preparing a precursor solution chilled to a temperature of between 20°-60° F. (−6.7°-15.5° C.); b) preparing a catalyst solution chilled to a temperature of between 20°-60° F. (−6.7°-15.5° C.); c) mixing the chilled catalyst solution with the chilled precursor solution to form a mixed solution with the mixed solution having a pH of between 9.5 and 12.2; d) maintaining the mixed solution at a temperature range of between 34°-55° F. (1.1°-12.8° C.) and aging the mixed solution for a time of between 1-120 minutes to form a gel and control a particle size distribution of the gel; e) silating the gel for a time period of between 1-120 minutes; f) washing the gel in wash fluid; and g) drying the gel to form the aerogel, with the aerogel having a density in the range of about 1.87-15.61 lb/ft$^3$ (0.03-0.250 g/cc), an R value of at least 20 and light transmission of at least 25%.

BRIEF DESCRIPTION OF THE DRAWINGS

The invention will now be described, by way of examples, with reference to the accompanying drawings in which:

FIG. 7 is a table I which lists test results for Kalgel aerogel vs. competitive aerogel products;

DETAILED DESCRIPTION OF THE INVENTION

The present invention is directed to an improved process and novel chemistry for the manufacture of a variety of types of aerogel product, including granules, films, monoliths, and hybrid composites.

As used herein, an "aerogel" includes structures that are microporous or have a nanoporous lattice from which a solvent has been removed, such as a xerogel, silica gel, and water glass.

The term "granules" refers to aerogel bodies of a generally organized dimensional geometry for specific applications that were optimized for an efficient end use.

The term "particle" refers to micro-granule.

The term "monolith" refers to a single aerogel body having a minimum dimension, i.e., a thickness, with the other two dimensions being larger than the thickness, or to a cylindrical object having a diameter. The thickness or diameter is typically in the range of millimeters to tens of centimeters.

The term "hybrid" refers to an aerogel that has been formed with another substance, e.g., glass fibers dispersed in the gels or glass fibers doped with the aerogel raw materials (precursor-solvent-catalyst), or a new chemistry which involves a modified silica backbone.

The term "solvent" refers to the liquid dispersion medium used to form the gels which is later removed to form the aerogel in accordance with the invention. It is a non-supercritical fluid at the pressure and temperature of interest.

The term "dynamic frequency" refers to dynamic signals induced within the continuum for creating continuous micro vibrations generally in a pulsating form. The pulse (or wave) preferably has a sinusoidal waveform, but other types of waveforms, e.g., saw-tooth, square, gaussian, or harmonics of any of these, may also be utilized.

The term "gel point" as used herein refers to the stage at which the sol begins to exhibit pseudoelastic properties and the viscosity of the sol has increased and is generally in the range of between about 5500-10000 cps (centipose) or more preferably in the range of between at about 7500-8000 cps which thereby indicates gelling of the sol.

Figure 1A:
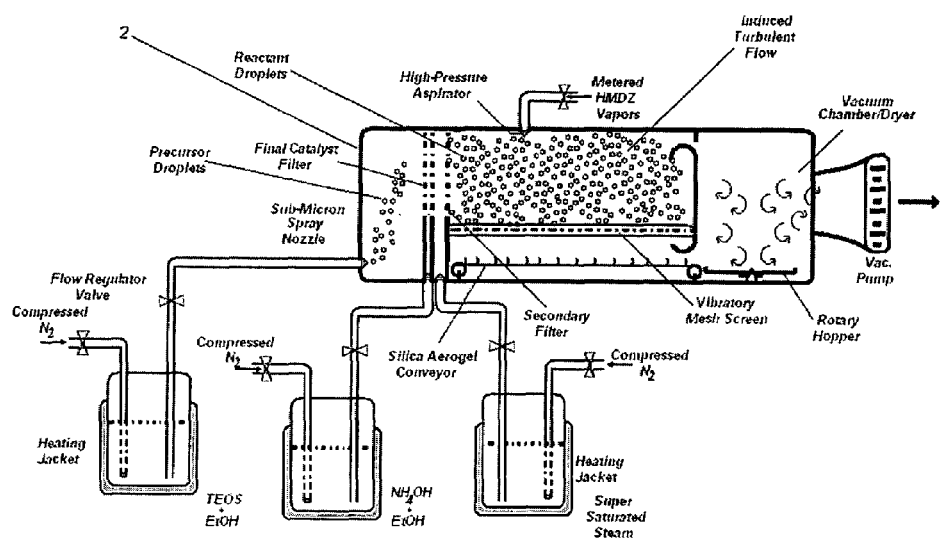
FIG. 1A diagrammatically illustrates a process for manufacturing the inventive aerogel via a vapor phase reaction.

With reference to FIG. 1A, a schematic drawing of a proposed aerogel manufacturing process is shown. This process focuses on the production of a transparent type aerogel which is clear and has super weathering coatings and, in particular, this vapor phase process focuses on the ability of efficiently and effectively doping Kalwall insulation (RAH reinforced angel hair and DRAH dense reinforced angel hair) thus providing a unique and inexpensive insulation with high a R-value, e.g., an R-value=8-40, and more preferably an R-value of at least 12. According to a first step, a precursor solution and a catalyst solution—each solution is described below in further detail—are both introduced into a controlled flow-mixing chamber 2. The mixing chamber 2 is preferably maintained under vacuum, e.g., at a negative pressure of between about 28-29.4 inches (71.12-74.68 cm) of Hg, for example, and typically at a temperature of between about 120°-200° F. (48.9°-93.3° C.). As the precursor solution and the catalyst solution are introduced into the mixing chamber 2 via metering pumps (not shown), they combine and mix with one another and react quickly, e.g., on the order of a few milliseconds, and create a dry gel (hydrophilic granular aerogel) byproduct. The temperature within the reaction chamber is maintained at a minimum of 120° F. (48.9° C.) and at a maximum of 200° F. (93.3° C.) and, as a result of this, the kinetics of the reaction are quite rapid. The formed gel is either treated with HMDZ vapors in the reaction chamber, thus rendered hydrophobic, or it is collected and discharged into a chamber, at a temperature of 43°-120° F. (6.1°-50.0° C.), where the chamber contains a 10% hexamethyl disilazane (HMDZ) solution in hexane, heptane or a higher alkane. The HMDZ solution is the silation agent. Mixing of the reaction byproducts in the HMDZ/hexane solution, at a temperature of about 122° F. (50.0° C.), continues for about 2-4 hours, most preferably for about 3 hours or so, while ultrasonic sawtooth vibrations are simultaneously introduced to the chamber. Next, the solvent is discharged, and the resulting residual alcogel is placed in a convection oven or on a fluid bed drier to dry the alcogel, as described below in further detail.

Figure 1B:
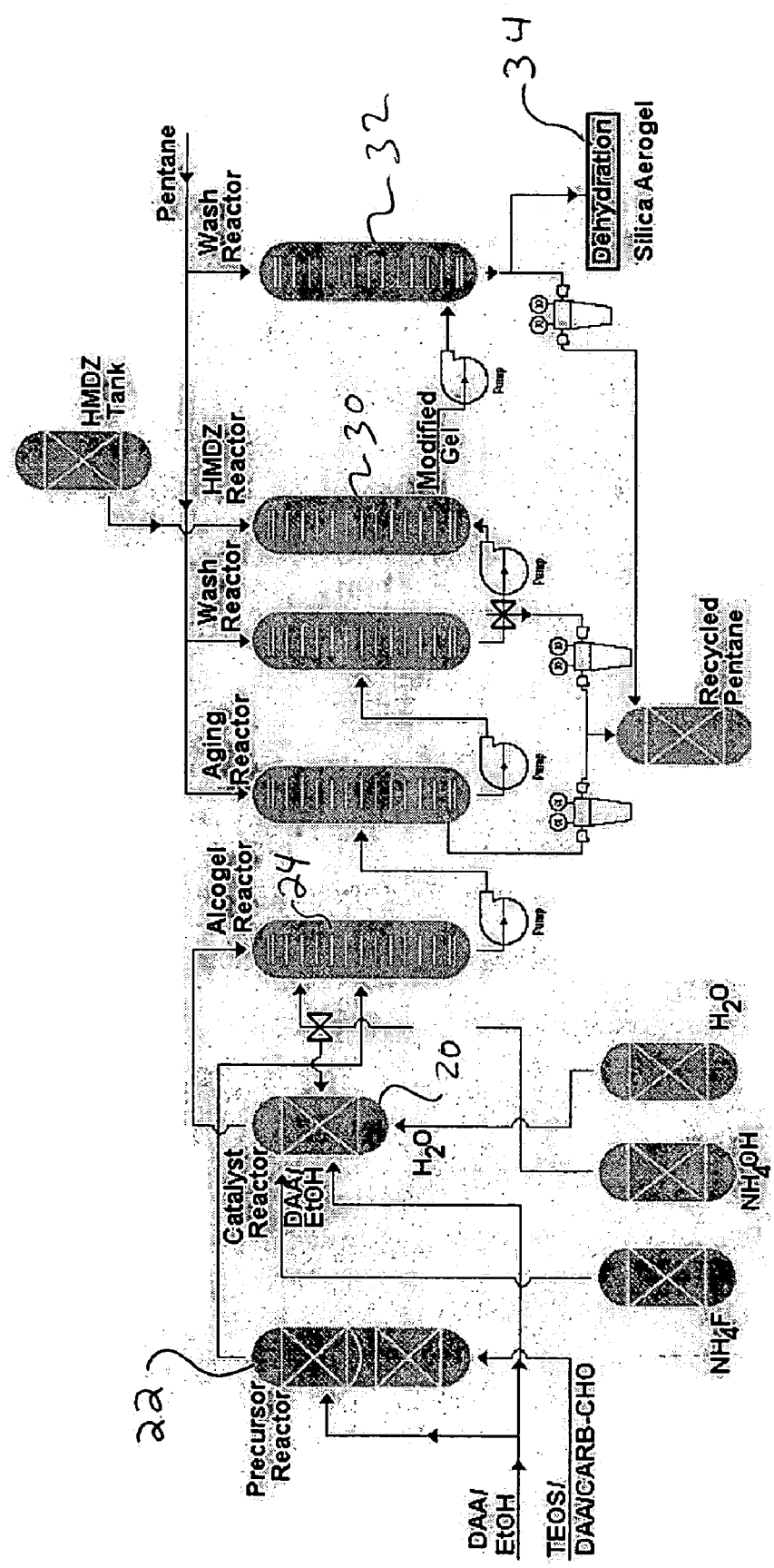
FIG. 1B diagrammatically illustrates describes an ambient pressure process for manufacturing of the inventive aerogel.
Figure 11:
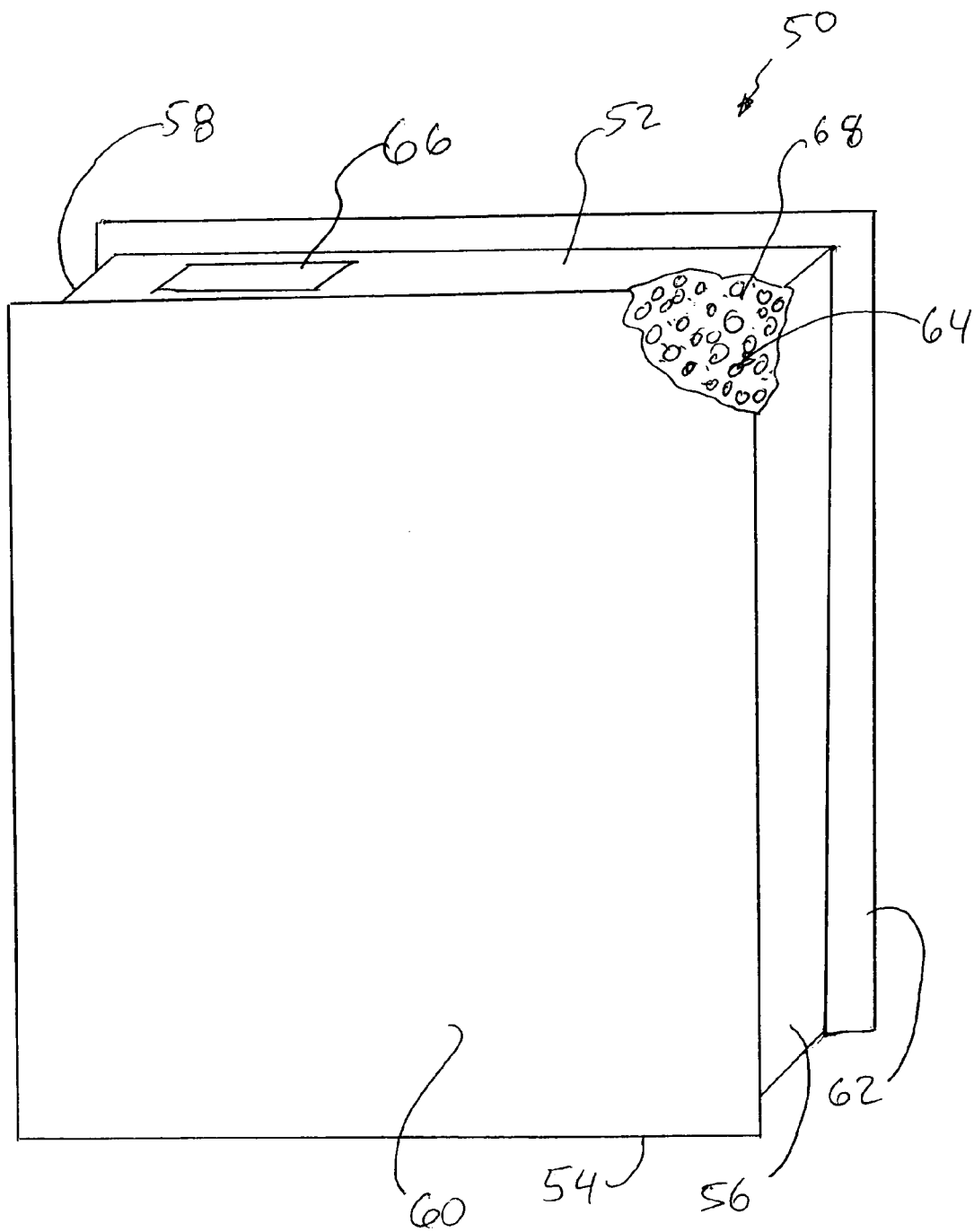
FIG. 11 is a diagrammatic representation showing use of the aerogel as an insulating material within an insulating panel.

The embodiment of the inventive process as seen in the schematic drawing of FIG. 1B is an alternative process which focuses on liquid/liquid phase reactions and produces translucent silica aerogel which is suitable for use as an insulating media, e.g., within an insulating panel (FIG. 11). The process includes the steps of combining the catalyst solution 20 and the precursor solution 22 in a reaction/aging chamber 24 and initiate the reaction, thus forming the alcogel. The gel, e.g., an alcogel, is then washed and introduced into a HDMZ reactor 30 and silated using 10% HMDZ solution in hexane, heptane or a higher alkane for about 2-6 hours, most preferably for about 3-4 hours, while ultrasonic vibrations are introduced. The HMDZ solution is next discharged, and the gel, e.g., an alcogel, is further washed in a wash reactor 32 with hexane, heptane or a higher alkane, while the gel, e.g., the alcogel, is continuously agitated. Finally, the gel, e.g., the alcogel, is collected and dehydrated or dried in a convection oven or a fluid bed dryer only generally shown as dehydration 34, for example, as described below in further detail.

Aerogels are open pore materials having about 80% or more porosity by volume and a pore size ranging from about 1-50 nm, preferably the pore size range from about 5-30 nm, and most preferably the pore size range from about 20-25 nm. Aerogels may be prepared from any gel-forming material(s) from which the solvent used for gelation can be removed by a drying process without destroying, significantly shrinking and/or collapsing the pore structure. Drying, for example, can be accomplished by supercritical extraction, atmospheric drying, freeze-drying, vacuum drying, or the like. In the relevant art, aerogels are typically produced by an ambient pressure drying/extraction of the solvent (or any liquid replacement for the solvent) that was used to prepare the starting gels.

According to the method of the present invention, the inventive aerogel (e.g., Kalgel) is initially dried by an ambient pressure drying process, typically at a temperature of about 122° F.±9° F. (50.0° C.±5° C.). This involves the evolution of inorganic networks through the formation of a sol and gelation of the sol to form a continuous phase.

The precursors for synthesizing these colloids consist of metal alkoxides. The most widely used alkoxides are the alkoxysilanes, such as tetramethoxysilane (TMOS) and tetraethoxysilane (TEOS).

At the functional group level, three reactions are generally used to describe the sol-gel process: (1) re-esterification/hydrolysis, (2) water condensation, and (3) alcohol condensation (alcoholysis). The general reaction schemes for each are illustrated below.

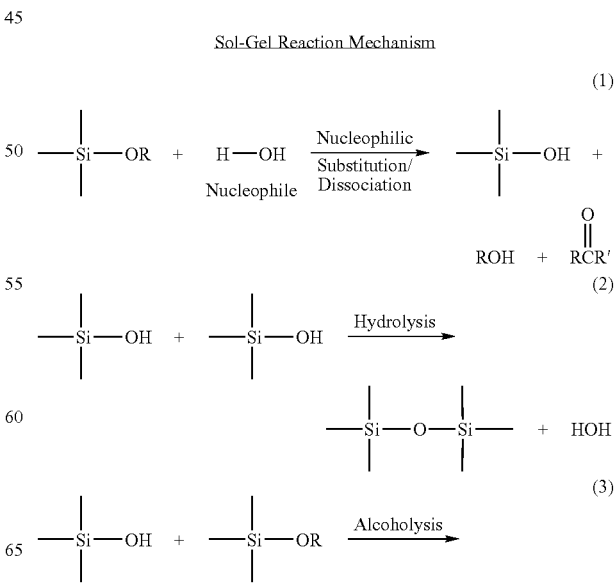

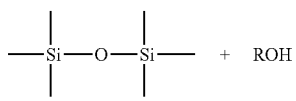

A consecutive reaction is the dehydration of DAA which results in formation of mesityl oxide (MO) as illustrated in equation (4) below:

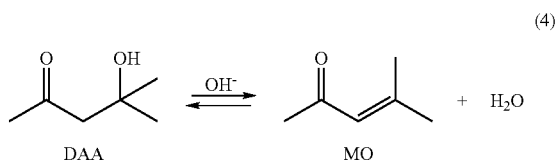

or in the formation of two molecules of acetone, as illustrated in equation (5) below:

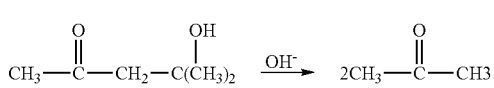

the MO formation is reversible, but the equilibrium is very much toward the side of MO formation. At the low concentrations of water and/or MO, the reverse reaction (MO+$H_2O$=DAA) can be negligible. Both DAA and MO can undergo aldol condensation with acetone, with DAA or MO forming heavier products, such as isophorone and isoxylitone.

The formation of DAA from AC is second order in AC, the formation of AC from DAA is first order in DAA, and the formation of MO from DAA is also first order in DAA. All three reactions are base catalyzed (e.g., a $NH_4OH$ catalyst). For nano-particles, the intra-particle diffusion is important. It is to be appreciated that diffusion limitations promote the formation of MO.

In equation (5), the rate of decomposition is first-order with respect to the concentrations of both diacetone alcohol and the hydroxide ion (generated from the catalyst). However, since the hydroxide ion is a catalyst, its concentration remains constant during the reaction and the overall reaction appears first-order.

Since the overall reaction is first-order, the kinetics of the reaction can be determined by measuring any property of the system that had undergone a change, which is proportional to the extent of the reaction. In such case, the property is the volume of the reaction solution.

It is worth noting that the effective volume of one molecule of diacetone alcohol is not the same as the effective volume of two molecules of acetone and, as a result of this, the total volume of the reaction solution changes as the reaction proceeds. In this case, the solution expands although in some reactions it may contract. This characteristic becomes critical when, for example, synthesizing a Kalgel aerogel in a fixed volume reaction vessel. As the gelling occurs, the stress exerted on the skeletal structure becomes a concern and must be relieved in order to maintain the high mechanical integrity for the final gel.

The temperature, the pH, the induced (sonic) energy, and the ratio of carbamaldehyde, alcohol, or DAA-to-the ratio of the precursor are among the most critical parameters which determine the characteristics of the resulting aerogel, e.g., the Kalgel aerogel. Those parameters control OH dissociation, hydrolysis, and polycondensation, and thus they can control the final characteristics of the resulting aerogel product.

By controlling the pH of the catalyst during formation of the gel to a pH of between 9.5-12.5, more preferably a pH of between 10.0-11.0, and most preferably at a pH of about 10.2, the optical clarity, the light scattering coefficient, and the mechanical properties of the resulting aerogel product are optimized. The Kalgel aerogel, for example, has a measured optical clarity C=0.0037 (zero is optimal) and a Light Scattering Coefficient A=0.7883 (one is optimal). The C and A values were determined using optical transmittance curves measured for the Kalgel aerogel samples, using a Keller Companies' sphectroradiometer. Optical transmittance T versus wave length between 400 and 700 nanometers were then plugged into Hunt's Equation, i.e., $T(\lambda)=A\ e^{-(Ct/\lambda expr4)}$, are optimum. As for mechanical properties, acoustic measurements of the Kalgel aerogel were measured and a Bulk Modulus of elasticity for the Kalgel aerogel was determined to be in the range of 0.60-0.70 Gpa. The density for Kalgel aerogel was measured to be in the range of 0.070-0.035 g/cc and have a Light Transmission=28% (Artificial Light) and 16% (Blue Sky). To assist with controlling the pH of the precursor/catalyst mixture, ammonium hydroxide $NH_4OH$, for example, can be added to the solution mixture if the pH is below 12.0, for example, (less basic/more acidic) while an acid such as acetic acid $CH_3COOH$ can be added to the solution mixture if the pH is above 10 (less acidic/more basic), for example. Optimization of the end product is achieved when all the raw materials (RM) are chilled to a temperature range of between 20°-60° F. (−6.7°-15.5° C.), more preferably chilled to a temperature range of between 33° F. to 55° F. (0.5°-12.8° C.) and most preferably chilled to a temperature of between 35° F. to 55° F. (1.5°-12.8° C.) during formation of the gel from the raw materials.

Figure 4A:
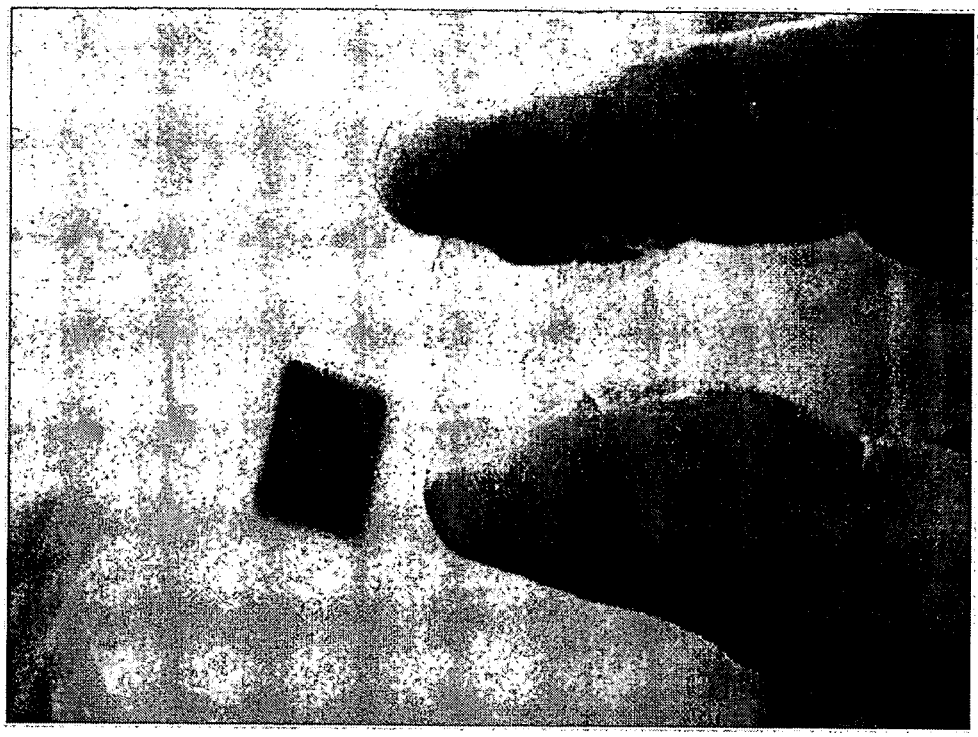
FIGS. 4A, 4B, 4C, 4D, 4E, and 4F illustrate the quality of second-generation of the inventive aerogel as manufactured using a rapid drying method, but having only DAA and the precursor (condensed TEOS, and pre-condensed silbond series) as the primary reactants.
Figure 4B:
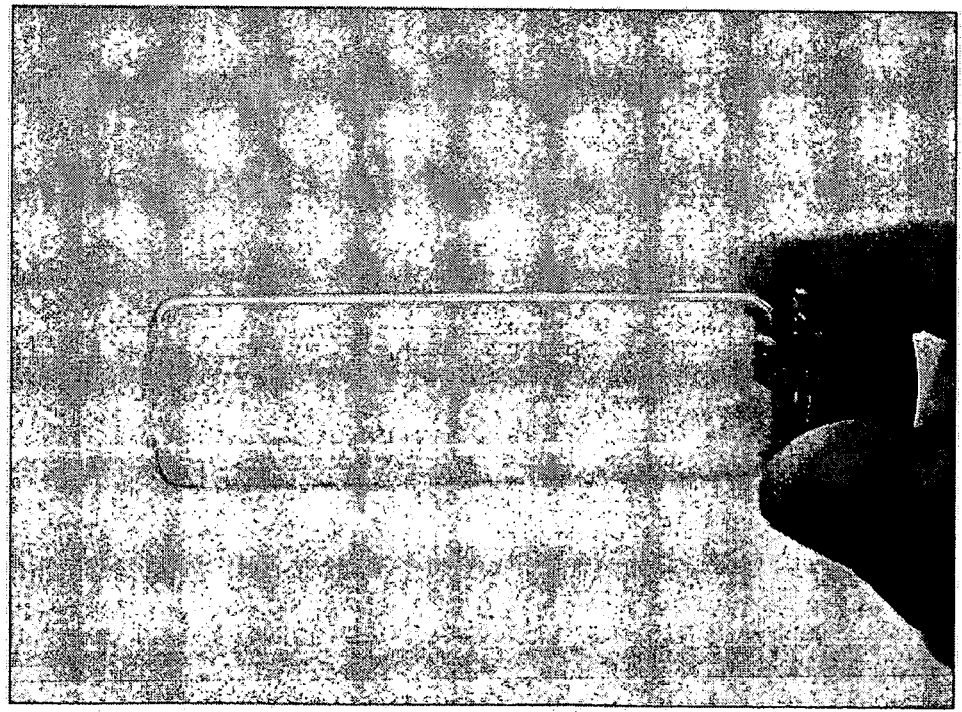
Figure 4C:
Figure 4D:
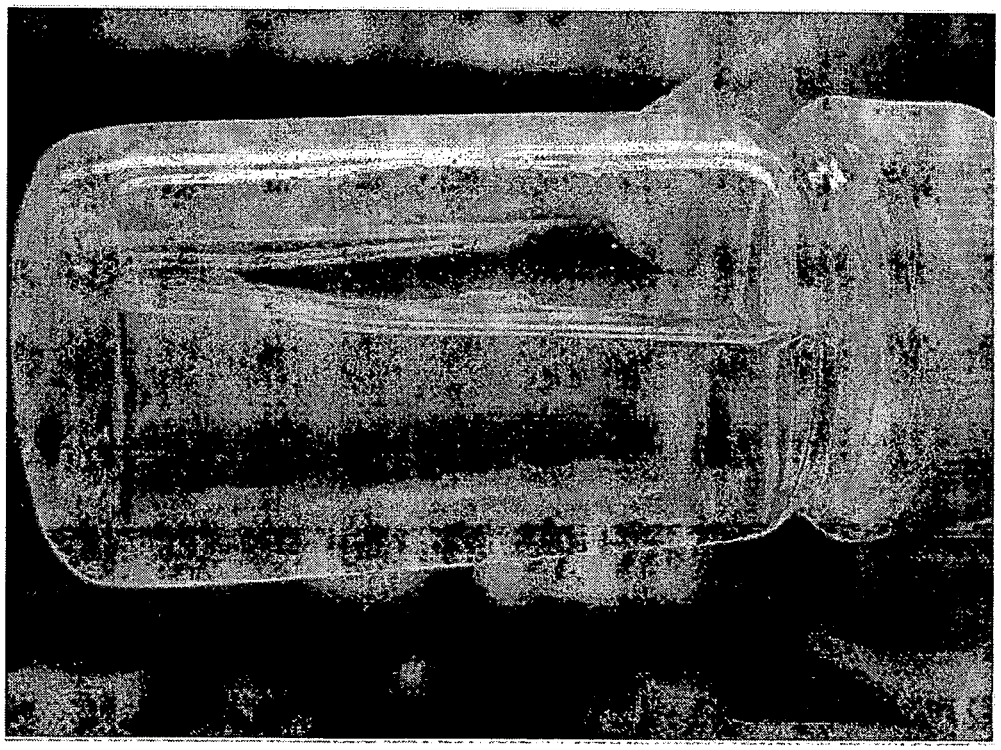
Figure 4E:
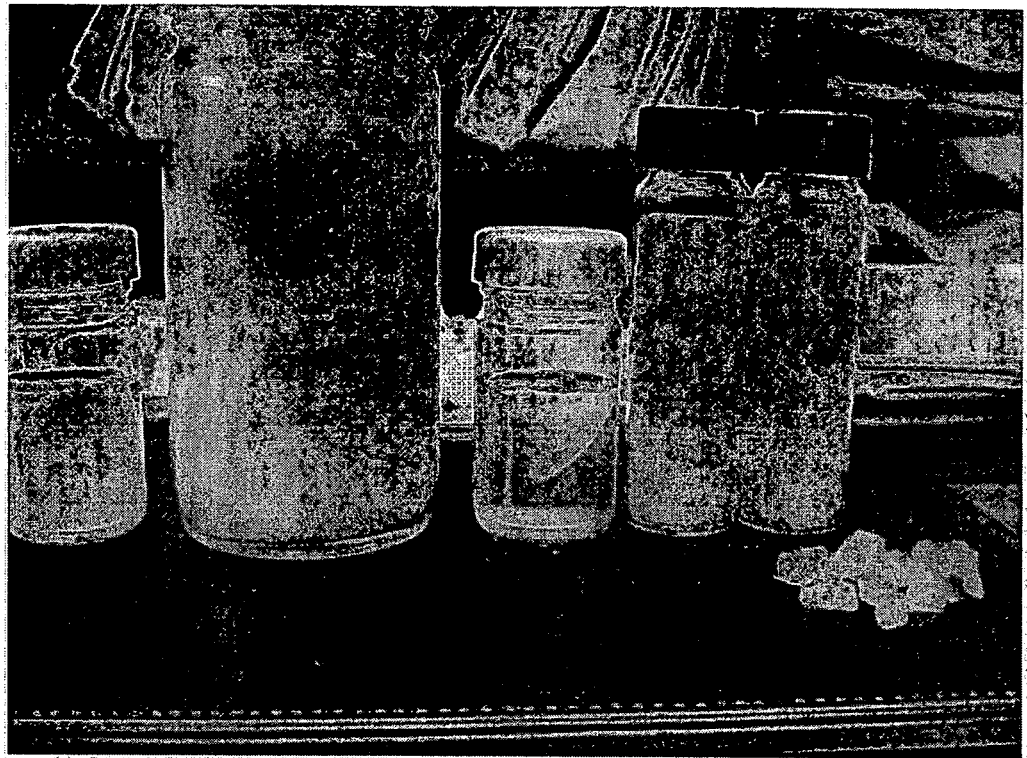
Figure 4F:
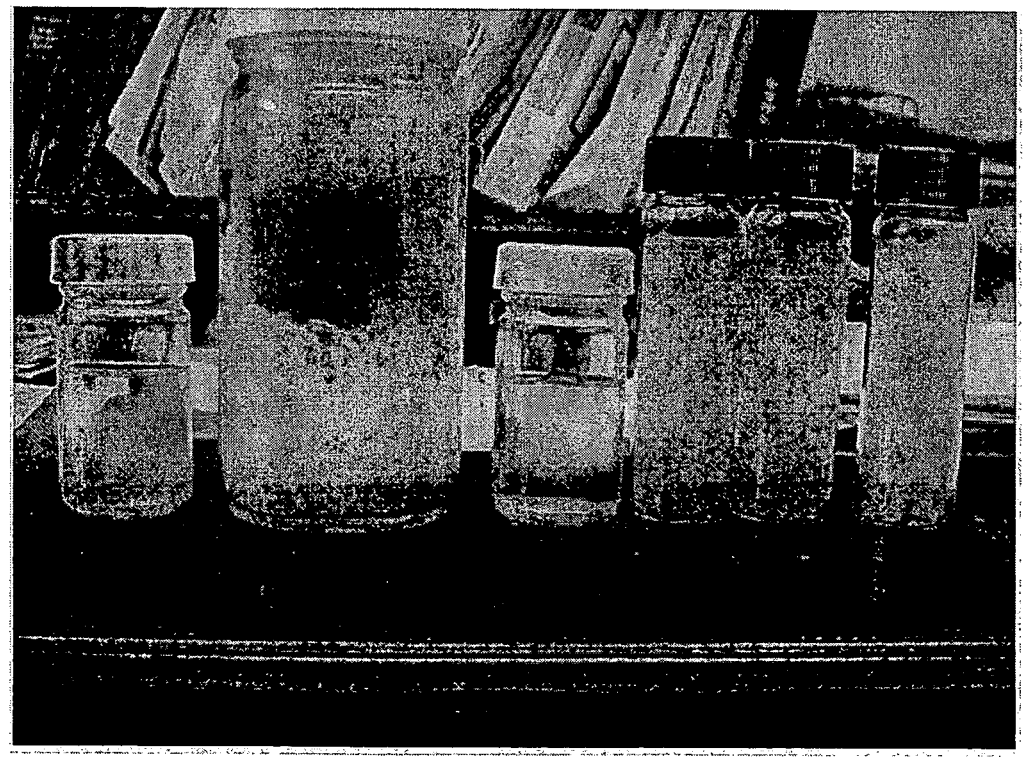

If reaction temperature is closely maintained at a temperature of from about 34° F. to 43° F. (1.1°-6.1° C.), for example, a crystal clear (sol) gel is produced, as illustrated in FIGS. 4A, 4B, and 4D. This behavior is critical and is mainly attributed to the ability to control particle growth while the particles self-assemble. By maintaining a narrow temperature range, the particle growth slowly but steadily undergoes a self assembly mode with a stable interpenetrating lattice structure. This steady self assembly process provides important properties which are reflected in the reduced light scattering, the improved optical clarity and light transmission, as well as the improved thermal stability and resistance to color degradation of the particles.

In the case of second generation Kalgel, the inventor found that a molar ratio ($r_M$) of diacetone alcohol to TEOS of 4:1, more preferably a molar ratio of diacetone alcohol to TEOS of 3.7:2.5, and most preferably a molar ratio of diacetone alcohol to TEOS of about 3:2, and at a chilled temperature of about 40° F.±3° F. (4.4°±1.7° C.) for all raw materials (including the catalyst) yields a crystal clear (sol) gel with extremely narrow particle size distribution of about 5-30 nm, preferably a particle size distribution of about 10-20 nm, and most preferably a particle size distribution of about 15-20 nm.

Thus, by controlling these factors, it is possible to vary the structure and properties of the (sol) gel-derived inorganic network over wide ranges. This is shown during the hydrolysis under basic conditions ($NH_4OH$ conditions), with R-values ranging from 2.5-40 where monodisperse spherical particles were produced.

In the case of the second generation Kalgel, the inventor introduced a novel aldehyde, with properties that leads to the elimination of the washing process. In particular, when this aldehyde, referred to as carbamaldehyde (also referred to as formamide) and more preferably de-ionized carbamaldehyde, is utilized, a critical reduction occurs in the forces (i.e., thermal stresses) which act to prevent collapse of the nano structure of aerogel. Thus, when the gel (e.g., hydrogel) is placed in an oven for drying, the water can be removed without an adverse impact on the final aerogel product, i.e., the final product is at least translucent or preferably approaching the transparency of glass. This aldehyde must be used in a ratio equal to about 0.3-3.0 times the weight of the precursor, more preferably about 0.5-2.0 times the weight of the precursor, and most preferably about 0.75-1.5 times the weight of the precursor.

Generally speaking, the (sol) gel reaction mechanism clearly illustrates how a hydrolysis reaction replaces alkoxide groups (OR) with hydroxyl groups (OH). Subsequent condensation reactions involving silanol groups (Si—OH) produce siloxane bonds (Si—O—Si) plus byproducts such as a very little water and alcohol as well as acetone. Under most conditions, condensation commences before hydrolysis is complete. However, as mentioned earlier, conditions such as pH, the DAA/Si molar ratio, and the catalyst can induce completion of hydrolysis before condensation begins.

As the number of siloxane bonds increases, the individual molecules are bridged and aggregate in the sol. When the sol particles aggregate, or inter-knit into a network, the gel is formed. Upon drying, the trapped volatile components (such as water, alcohol, etc.) are driven off and the network shrinks as further condensation occurs. It should be emphasized, however, that the addition of solvents and certain reaction conditions might promote esterification and depolymerization reactions.

While a single alkoxide-alcohol (DAA) solution is generally used, a combination of two or more alkoxide-alcohol solutions may be used to fabricate mixed oxide aerogels. After formation of the alkoxide-alcohol solution, dissociation of DAA in a base-catalyzed environment yields water and acetone as the byproducts, where the water causes hydrolysis so that a hydroxide in a "sol" state is present. When using TEOS, the hydrolysis reaction is:

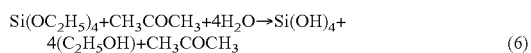

$$Si(OC_2H_5)_4 + CH_3COCH_3 + 4H_2O \rightarrow Si(OH)_4 + 4(C_2H_5OH) + CH_3COCH_3 \quad (6)$$

As the sol state alkoxide solution is aged, an aerogel monolith begins to show its nanocrystaline form. According to the invention, aging generally occurs over a period of preferably about 20-120 minutes, where condensation reaction reaches full maturity, as illustrated in equation (7) below:

$$Si(OH)_4 \rightarrow SiO_2 + 2H_2O \quad (7)$$

Figure 10:
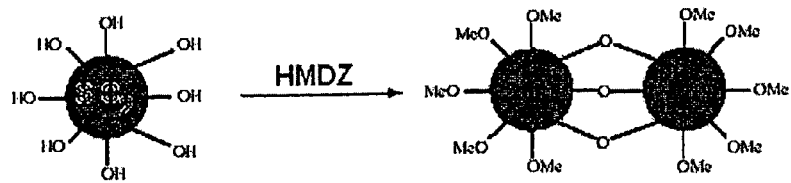
FIG. 10 is an illustration of the silation process and OH capping used to cap the free hydroxyl groups.

The silation process and OH capping is the method used to cap free hydroxyl groups, at which point the gel is rendered hydrophobic. The preferred silating agent is HMDZ (hexamethyl disilazane). Use of a silating agent is not novel. That is, the silating agent is used in generally in the same manner it has always been used in the relevant art. However, the novelty according to the present invention, is two-fold:
  (a) HMDZ which utilized by the present process is technical or commercial grade (i.e., not high purity), yet the results obtained are still as good as those obtained using high purity HMDZ; and
  (b) The point at which the HMDZ is added is critical in capping OH and when using commercial grade HMDZ. The process is illustrated in FIG. 10.

A 10% chilled (at a temperature of between 34° F. to 43° F. (1.1°-6.1° C.)) solution of HMDZ, in hexane, heptane, or pentane, for example, is added to the sol mass (sol gel), just at the moment when formation of the initial or first gel occurs and is complete, as opposed to the current state of the art where HMDZ is added after the washing step. The above percent is based on the amount of alkoxide added in the formulation. Silation takes effect as aging continues over a period of about 20-120 minutes, for example. After this time period, an ambient pressure drying process commences.

Figure 9:
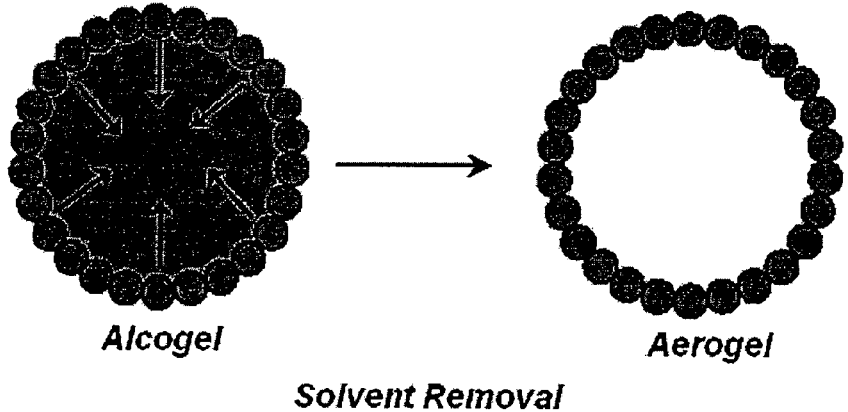
FIG. 9 is an illustration showing the displacement of residual water with acetone and alcohol.

An ambient pressure drying of the wet gel (i.e., alcogel) generally commences at the end of the aging and wash cycles. Prior to drying, the gel mass (e.g., the hydrogel-alcogel mass) is immersed twice in hexane, pentane, or most preferably heptane. The heptane is typically chilled to a temperature of 34° F. to 43° F. (1.1°-6.1° C.), and added to the chilled gel mass. This gel mass is then subjected to a sawtooth type or sine wave type vibration. Such vibration enhances the diffusion of the solvent throughout the skeletal structure of the nanogel. In order to induce thermal shock propagation in the gel mass and cause displacement of residual water (i.e., a byproduct) with acetone and alcohol (i.e., byproducts of the synthesis process), as seen in FIG. 9, the wash solvent can be heated to a temperature of 140° F. (60° C.), for example, and such a drastic temperature difference, between the chilled gel, at 43° F. (6.1° C.) for example and the heated wash solvent, induces thermal shock propagation in the gel mass.

A first heptane wash cycle typically occurs for a period of about 2 hours or so. Generally, a second wash occurs immediately thereafter, for a period of about 2-4 hours or so. Both of the solvent washes each occur at a temperature of about 122° F. (50° C.). During the solvent wash process, dynamic waves are transmitted throughout the gel mass to assist with diffusion.

According to the present invention, the efficiency of the solvent exchange process is enhanced by increasing the solvent effective mass diffusivity. More particularly, improved solvent exchange efficiency was achieved by inducing ultrasonic waves through the solvent medium. This was accomplished using high frequency low amplitude vibration (pulsating) waves—e.g., at a frequency about 200-3500 Hz and an amplitude below 0.002 inches (0.005 cm).

The mechanism of diffusion enhancement using ultrasonic high frequency vibrations at the interface region of the solvent (liquid alcohol) and the alkane wash fluid phase is due to the differential wave propagation coupled with acoustic impedance within the solvent systems. The vibrations travel through the wash fluid (e.g., alkane) through the porous gel, and again into the solvent-solvent interface. Due to the impedance discontinuity, the wave phenomenon may be assumed to be two-fold and out of phase. This causes molecules within the wash fluid to propagate at different velocities. This creates micro-signals within the interface and nano signals within the porous media, leading to enhanced diffusion within the solvent continuum.

As the enhanced diffusion process continues, the interface region moves in the direction of the remaining solvent liquid region of the gel until that region completely disappears and the entire gel structure contains an alkane phase. Once this occurs, the entire gel structure participates in a mass transport enhanced mostly by slower pulses that generate a longer distance pumping effect. The pumping action of the vibratory signals tends to rapidly lower solvent concentration inside the gel at a rate much faster than that of a simple diffusion process relying merely on a concentration gradient.

Figure 2A:
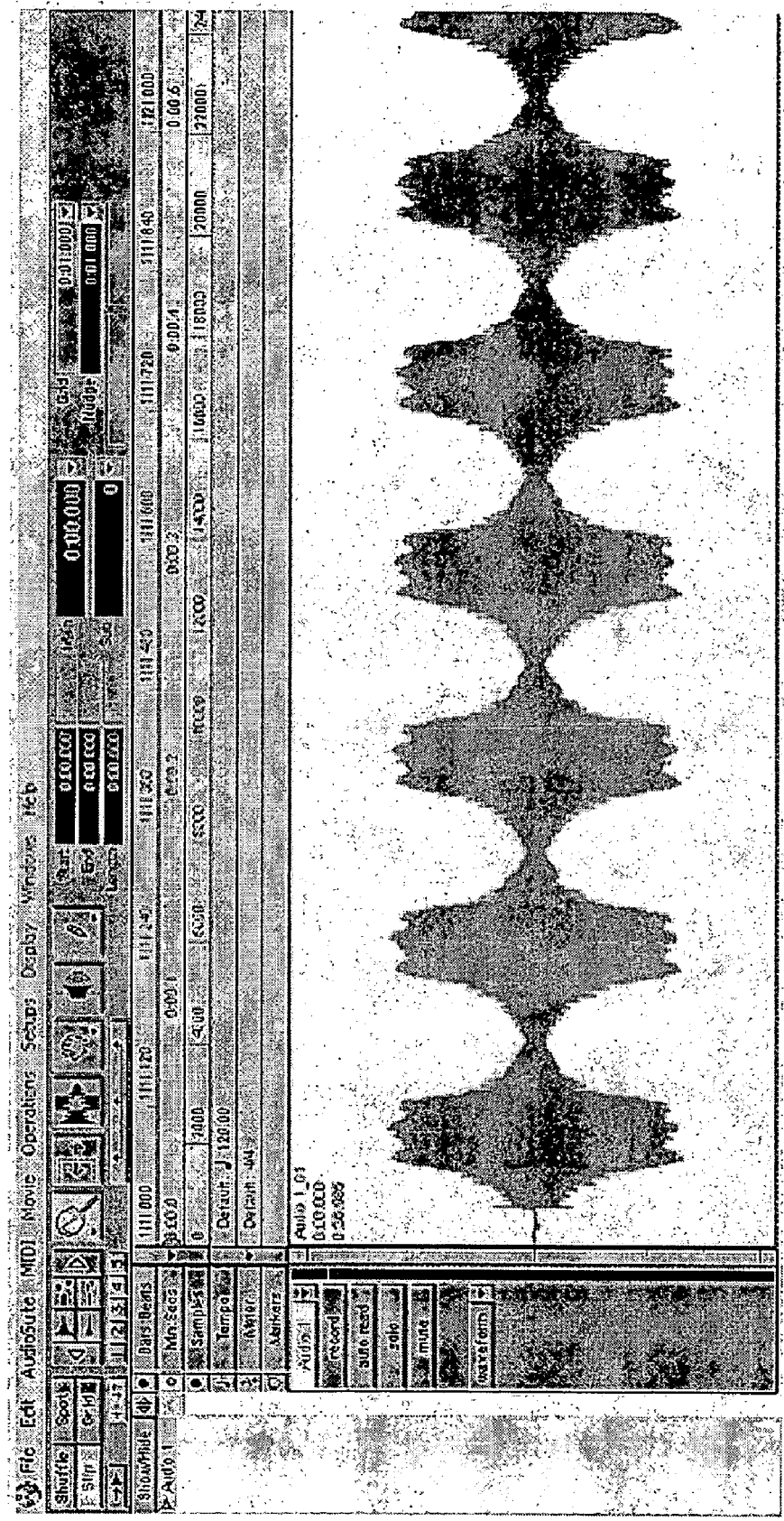
FIG. 2A illustrates a condensed acoustic trace for the inventive aerogel manufactured by the inventive method.
Figure 2B:
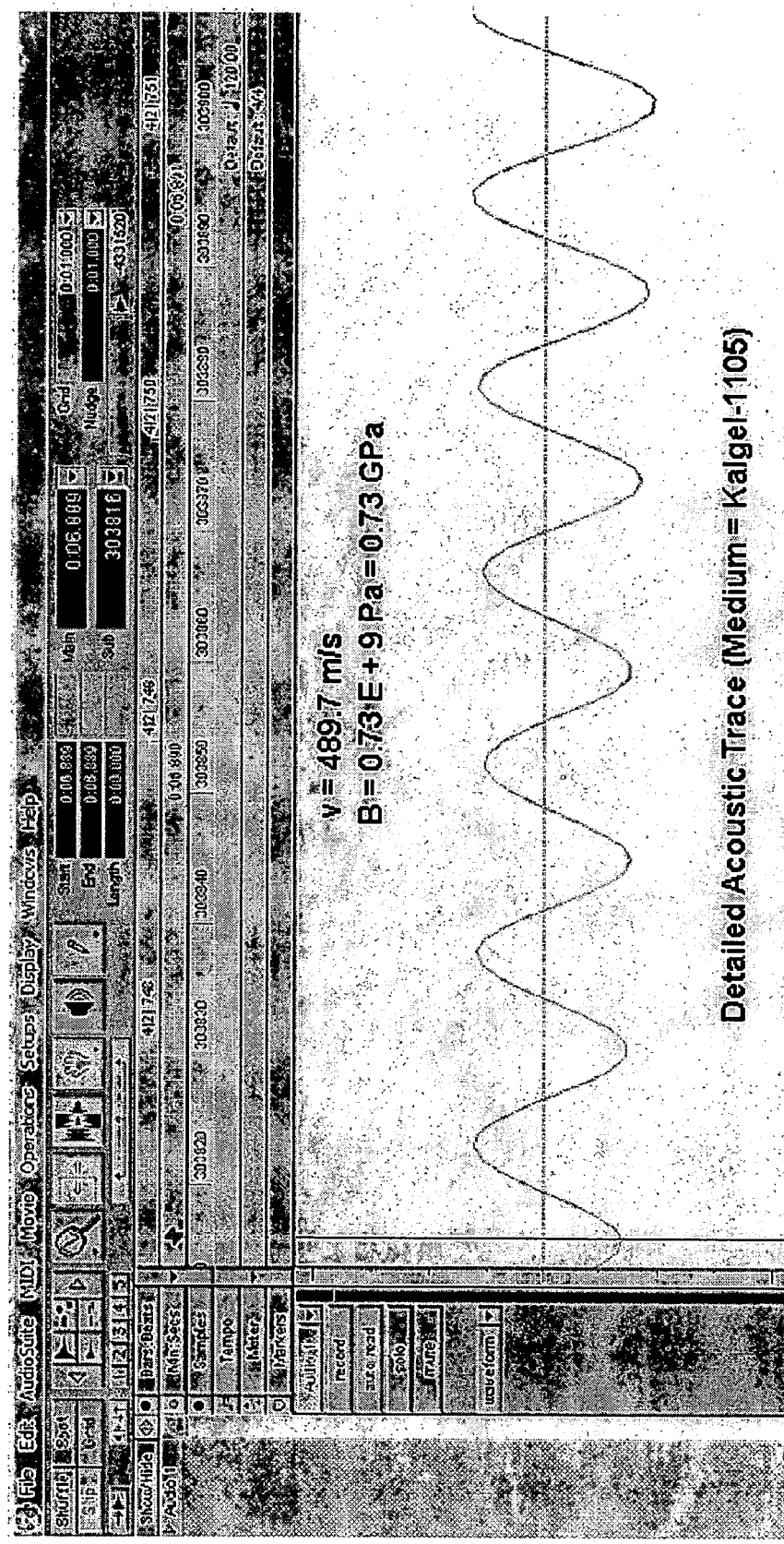
FIG. 2B illustrates the expanded acoustic trace of FIG. 2A for the inventive aerogel manufactured by the inventive method.
Figure 3A:
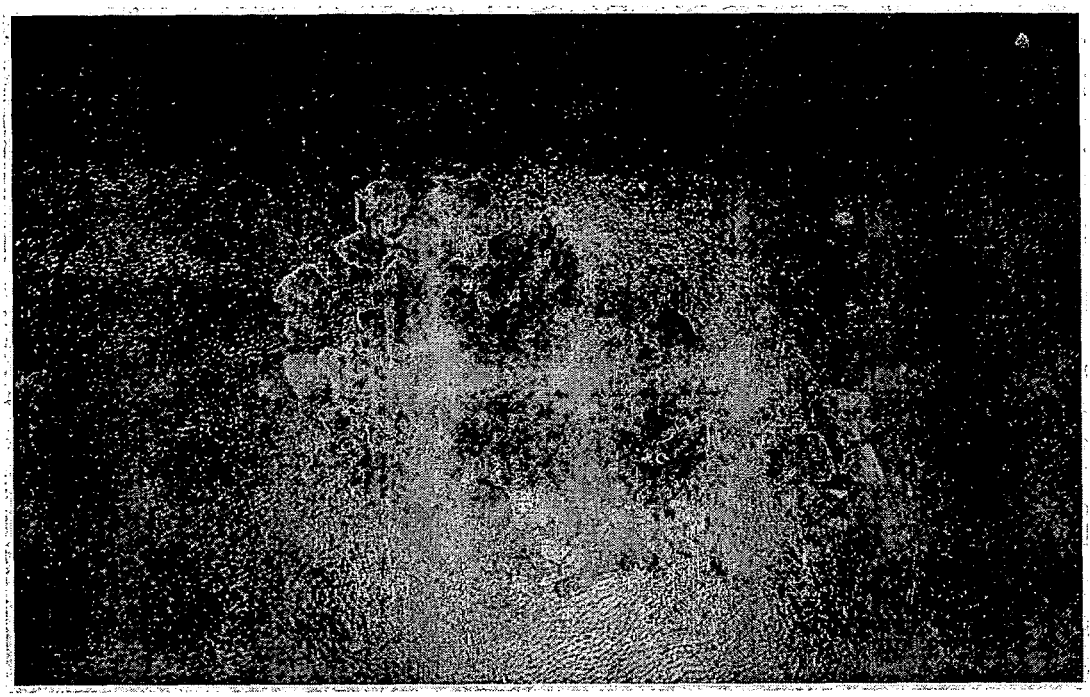
FIGS. 3A, 3B, 3C, and 3D are photographs illustrating the quality of first-generation of the inventive aerogel.
Figure 3B:
Figure 3C:
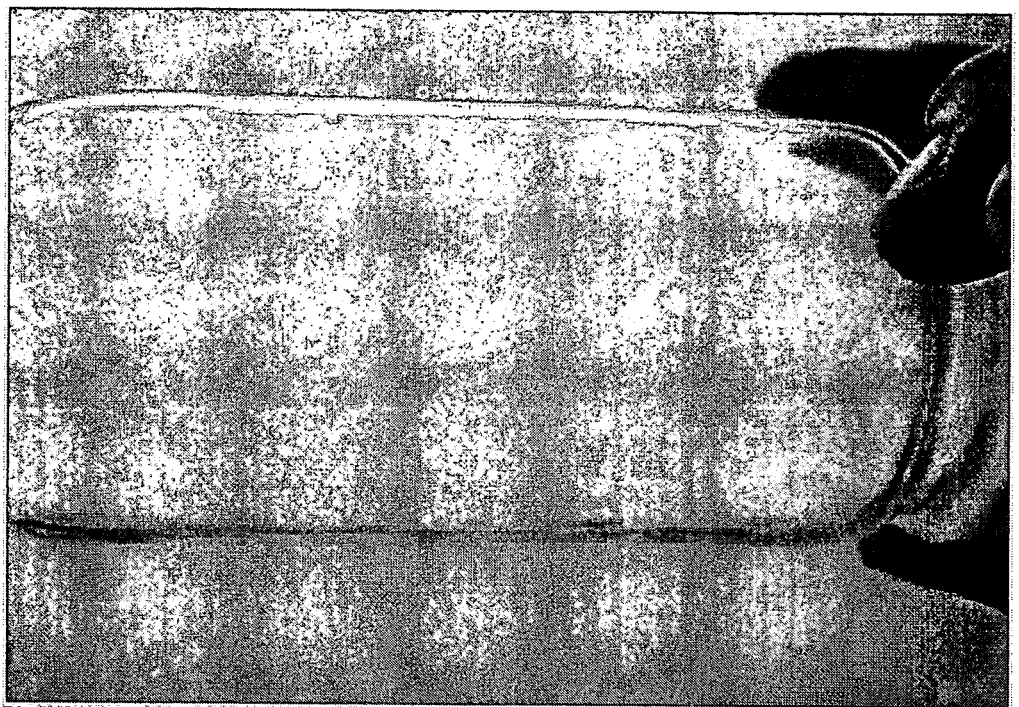
Figure 3D:
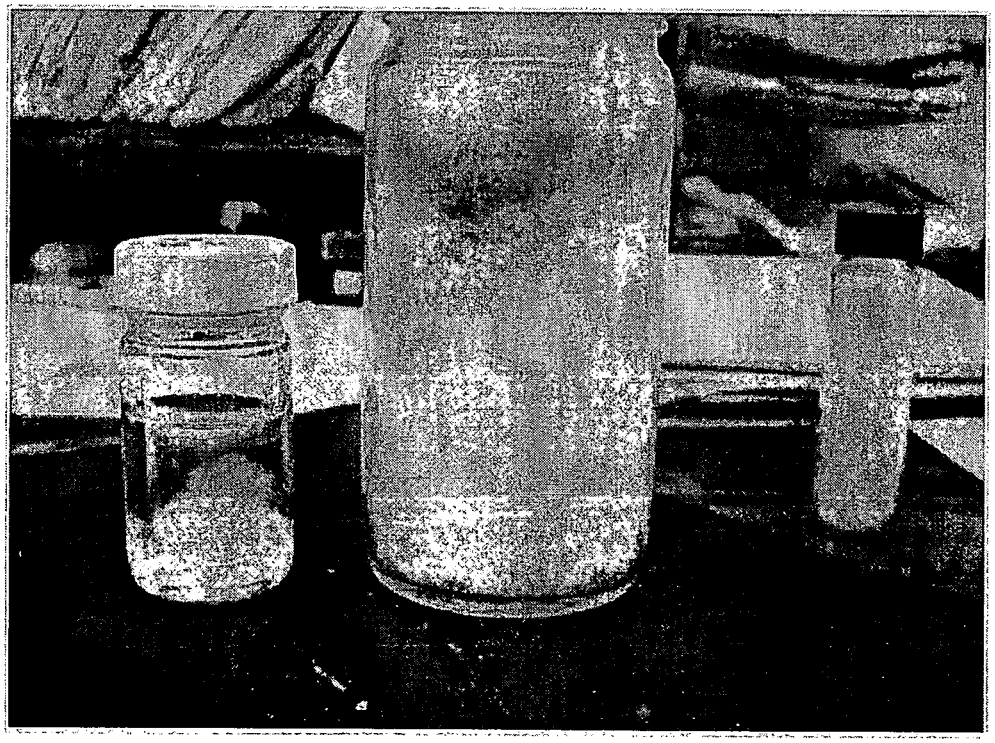
Figure 8:
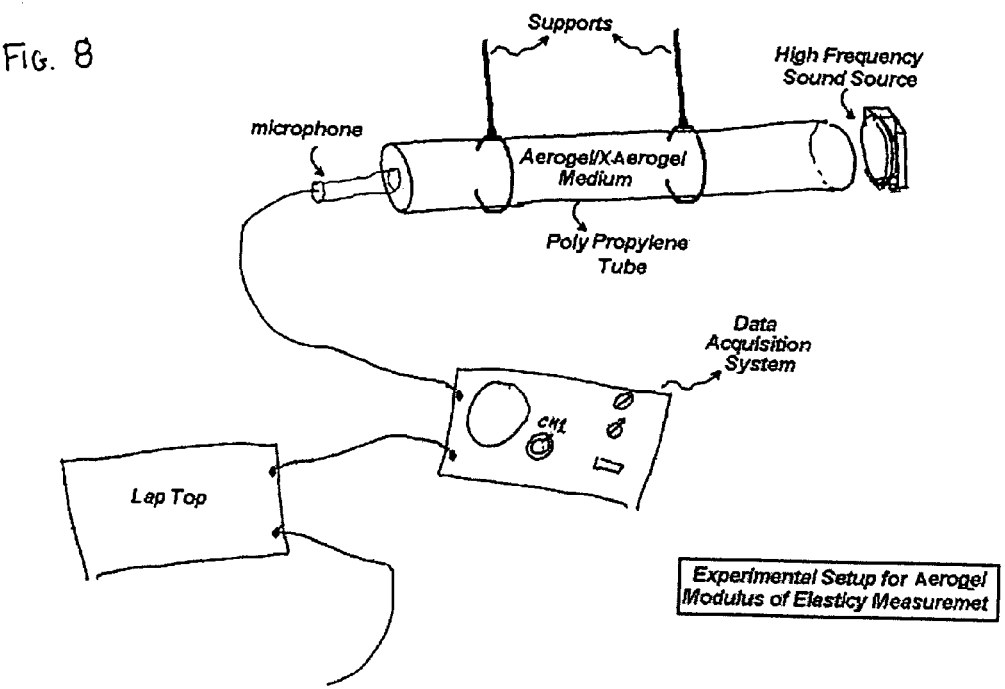
FIG. 8 is an experimental set up for testing a modulus of elasticity of the Kalgel aerogel.

As can be seen in FIG. 2A, a condensed acoustic trace illustrate the high internal mechanical characteristics of the aerogel. As seen in the FIG. 8, a high-density polyethylene (HDPE) tube is filled with granular Kalgel aerogel. A high frequency sound signal is introduced at one end of the tube, and a sound detector is placed at the other opposite end of the tube. The sound detector is connected to a data acquisition system (DAS), where data is collected and evaluated using ProTools Software. FIGS. 2A and 2B are condensed acoustic trace and the detailed acoustic trace obtained by the ProTools Software.

Figure 5A:
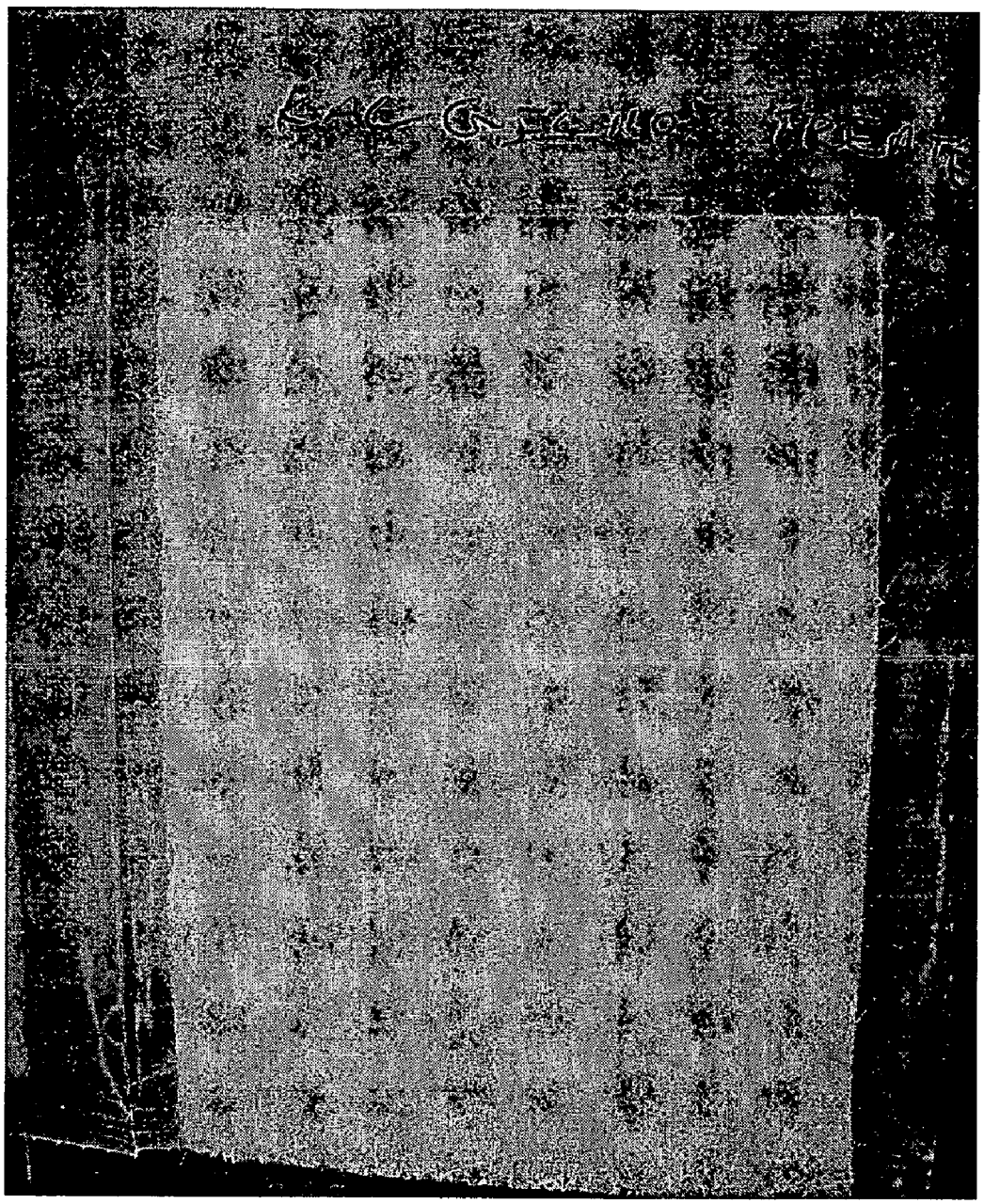
FIGS. 5A and 5B illustrate hybrid type insulation doped with the inventive areogel and an untreated insulation (control), respectively.
Figure 5B:
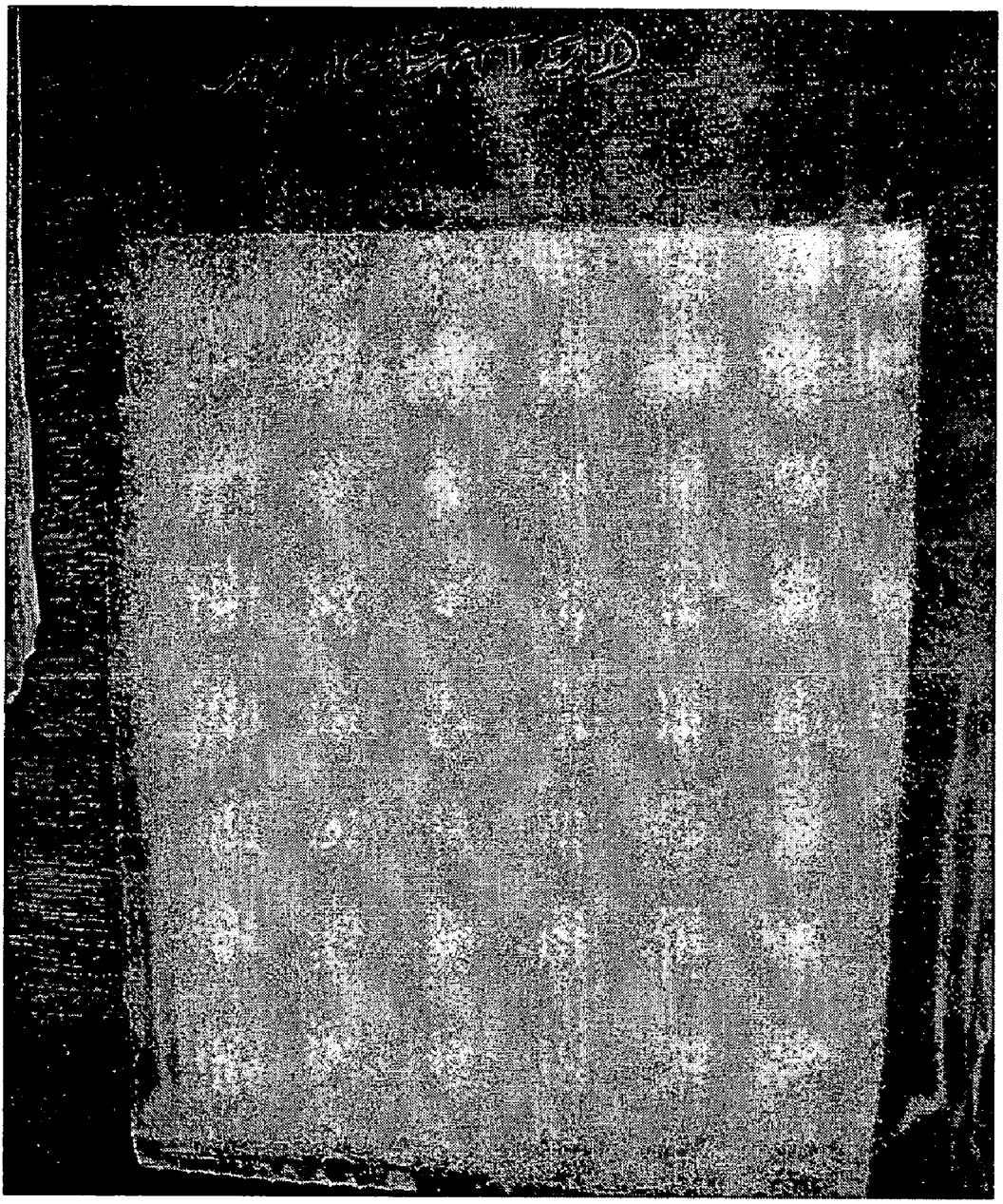

In FIG. 5A, Reinforced Angel Hair (RAH) is doped with the inventive aerogel and processed at ambient temperature. The final insulation is referred to as a hybrid insulation.

Figure 6:
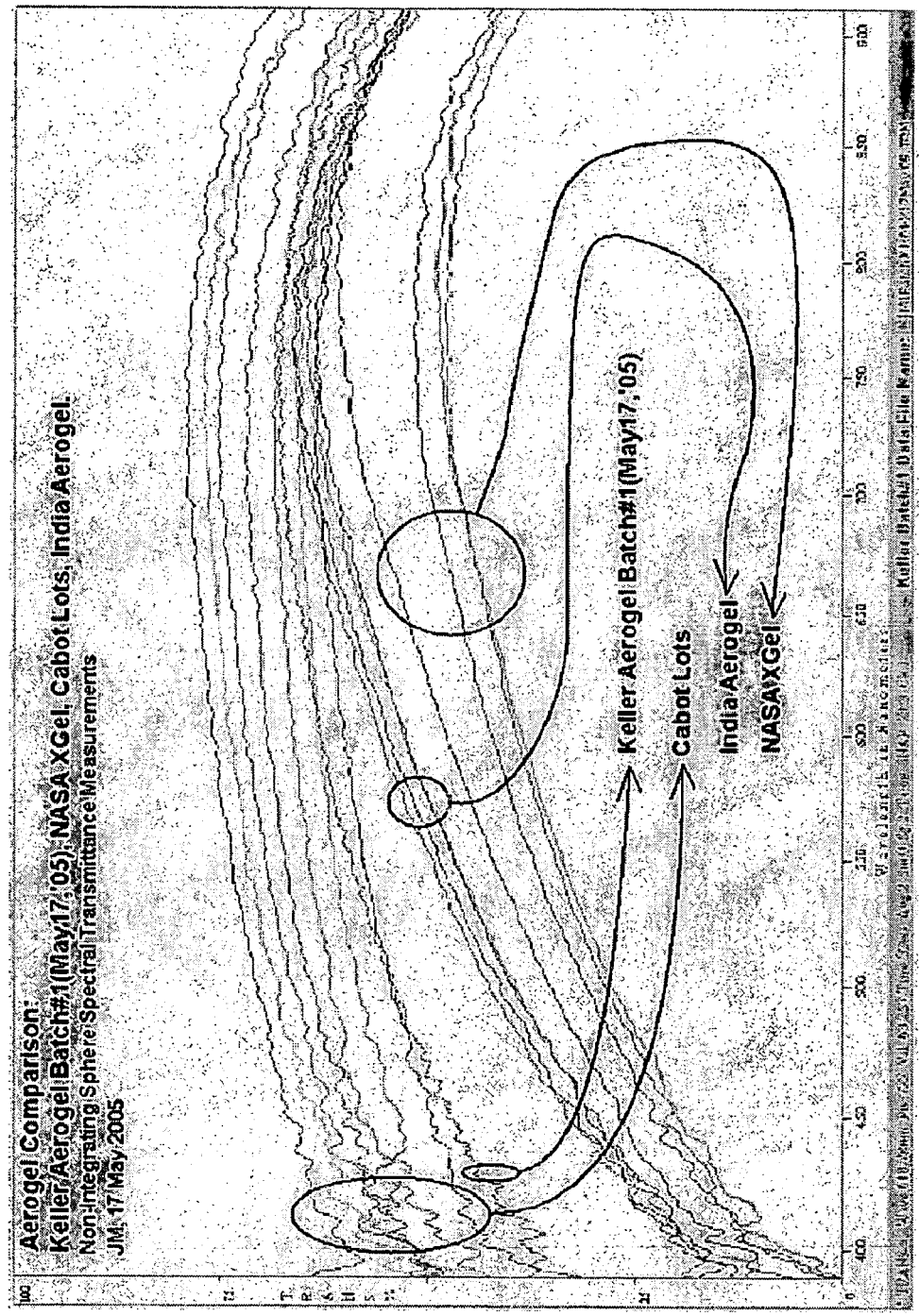
FIG. 6 is a transmission curve comparing a Cabot Aerogel, a NASA Aerogel, an India Aerogel, and the areogel according to the present invention.

FIG. 6 is a graphic representation of a number of transmission curves comparing a Cabot™ Aerogel, a NASA™ Aerogel, an India™ Aerogel, and the inventive areogel according to the present invention. It is a measure of the percent transmittance versus wavelength (nm). The graph indicates the superior light transmission properties of the inventive areogel according to the present invention in the visible light region, with a solid cut-off region in the UV range of the spectrum.

Typically, an acid or a base catalyzed TEOS-based gels are often classified as "single-step" gels, referring to the "one-pot" nature of this reaction. A recently developed approach (i.e., the Kalgel approach) uses pre-polymerized TEOS as the silica source.

Pre-polymerized TEOS is prepared by heating an ethanol solution of TEOS with a sub-stoichiometric amount of water and an acid catalyst, such as hydrochloric acid. The solvent is removed by distillation, leaving a viscous fluid containing higher molecular weight silicon alkoxides. This material is redissolved in ethanol and reacted with additional water under basic conditions until gelation occurs. Gels prepared in this way are known as "two-step" acid-base catalyzed gels. Pre-polymerized TEOS is available commercially in the United States from Silbond Corp. (i.e., Silbond H-5, H-30, H40, etc.), for example.

These slightly different processing conditions impart subtle, but important changes to the final aerogel product. Single-step base catalyzed aerogels are typically mechanically stronger, but more brittle, than two-step aerogels. While two-step aerogels have a smaller and narrower pore size distribution, they are often optically clearer than single-step aerogels.

Two wet gel samples were prepared essentially from tetraethoxysilane (TEOS) as described in Example 1 below. The aerogel had a density of approx. 0.045 g/cc. The gel time was approximately 10-115 minutes, depending on temperature (in this instance, the inventor used chilled raw materials).

EXAMPLE 1

A. Preparation of Precursor Solution

Wt. of chilled (i.e., 20° F. to 43° F. (−6.7°-6.1° C.)) alkoxide=440.4 grams
Wt. of chilled (i.e., 20° F. to 43° F. (−6.7°-6.1° C.)) absolute EtOH=400 grams B. Preparation of Catalyst Solution Wt. of chilled (i.e., 20° F. to 43° F. (−6.7°-6.1° C.)) absolute EtOH=240 grams
Wt. of chilled (i.e., 34° F. to 43° F. (1.1°-6.1° C.)) de-ionized water=333 grams
Wt. of ammonium hydroxide (i.e., 20° F. to 43° F. (−6.7°-6.1° C.))=1.79 grams (for a final pH of 12.20 or gamma-APTES=(1.20 grams) with the catalyst solution having a temperature of between 34° F. to 43° F. (1.1°-6.1° C.) so as to prevent crystallization or freezing of the water within the solution. The final aerogel properties are C=0.0045 $\mu m^4$/cm; Light Scattering Coefficient A=0.884; Light Transmission (% LT) of 41% for Artificial Light and 25-27% for Blue Sky, and for a Kalwall Panel incorporating the inventive aerogel, a Light Transmission (% LT) of 25-27% for Artificial Light passing therethrough and 19-20% for Blue Sky Day passing therethrough; a density of 0.044-0.091 g/cc; a Bulk Modulus of Elasticity=0.33 Gpa; and a Durometer Hardness (Type A)=32-35.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 9.5-12.2, preferably between 10.0-10.5, and most preferably at 10.2, and the viscosity of the mixture is at about 5500-10000 cps (centipose) or more preferably between about 7500-8000 cps, a 10% solution of hexamethyl disilazane (HMDZ) in hexane (99% assay) is added thereto at ambient temperature, e.g., 72±5° F. (22.2°±2.8° C.). It is important to ensure that the weight of the HMDZ is 10% of the initial weight of the precursor solution. The combined mixture is continued to be mixed for about 20±4 minutes and then aged for a period of 8-12 hours, after which, the HMDZ solution in hexane is discharged and then a second wash takes place by adding the hexane to the washed aerogel. The second wash takes a period of 8-24 hours at ambient temperature, e.g., 72±5° F. (22.2°±2.8° C.). The hexane wash solution is then discharged. The washed gel (e.g., alcogel) is then dried at a temperature of about 150° F. (65.6° C.) for about 6 hours, followed by drying at a temperature of about 220° F. (104.4° C.) for 6 hours, followed by drying (e.g., annealing of the aerogel) at a temperature of about 392° F. (200° C.) for up to 6 hours, e.g., typically between about 0.5-2 hours. The dried product is collected and screened, per the specific requirements, to obtain the final nanogel.

EXAMPLE 2

A. Preparation of Precursor Solution

Wt. of chilled (i.e., 20° F. to 43° F. (−6.7°-6.1° C.)) alkoxide=900 grams
Wt. of chilled (i.e., 20° F. to 43° F. (−6.7°-6.1° C.)) absolute EtOH=800 grams B. Preparation of Catalyst Solution Wt. of chilled (i.e., 20° F. to 43° F. (−6.7°-6.1° C.)) absolute EtOH=560 grams
Wt. of chilled (i.e., 20° F. to 43° F. (−6.7°-6.1° C.)) ammonium hydroxide=2.27 grams (for a final pH=12.20 or gamma-APTES=1.83 grams) with the catalyst solution having a temperature of between (i.e., 20° F. to 43° F. (−6.7°-6.1° C.). The final aerogel properties are C=0.0065 $\mu m^4$/cm; Light Scattering Coefficient A=0.780; Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.091 g/cc; a Bulk Modulus of Elasticity=0.33 Gpa; and a Durometer Hardness (Type A)=32-35.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 9.5-12.2, preferably between 10.0-10.5, and most preferably at 10.2, and the viscosity of the mixture is at about 5500-10000 cps (centipose) or more preferably at about 7500-8000 cps, a 10% solution of hexamethyl disilazane (HMDZ) in hexane (99% assay) is added thereto at ambient temperature, e.g., 72±5° F. (22.2°±2.8° C.). It is important to ensure that the weight of the HMDZ is 10% of the initial weight of the precursor solution. The combined mixture is continued to be mixed for about 20±4 minutes and then aged for a period of 8-12 hours, after which, the HMDZ solution in hexane is discharged and then a second wash takes place by adding the hexane to the washed aerogel. The second wash takes a period of 8-12 hours at ambient temperature, e.g., 72±5° F. (22.2°±2.8° C.). The hexane wash solution is then discharged. The washed gel (e.g., alcogel) is then dried at a temperature of about 150° F. (65.6° C.) for about 6 hours, followed by drying at a temperature of about 220° F. (104.4° C.) for 6 hours, followed by drying (e.g., annealing of the aerogel) at a temperature of about 392° F. (200° C.) for up to 6 hours, e.g., typically between about 0.5-2 hours. The dried product is collected and screened, per the specific requirements, to obtain the final nanogel.

EXAMPLE 3

A. Preparation of Precursor Solution

Wt. of chilled (i.e., 20° F. to 43° F. (−6.7°-6.1° C.)) alkoxide=225.0 grams

Wt. of chilled (i.e., 20° F. to 43° F. (−6.7°-6.1° C.)) DAA=200.0 grams

B. Preparation of Catalyst Solution

Wt. of chilled (i.e., 20° F. to 43° F. (−6.7°-6.1° C.)) DAA=240 grams

Wt. of chilled 34° F. to 43° F. (1.1°-6.1° C.) de-ionized water=333 grams

Wt. of chilled (i.e., 20° F. to 43° F. (−6.7°-6.1° C.)) ammonium hydroxide=2.45 grams (for a final pH=12.20 or gamma-APTES=2.11 grams) with the catalyst solution having a temperature of between 34° F. to 43° F. (1.1°-6.1° C.) so as to prevent crystallization or freezing of the water within the solution. The final aerogel properties are C=0.0031 $\mu m^4$/cm; Light Scattering Coefficient A=0.872; Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.110 g/cc; a Bulk Modulus of Elasticity=0.53 Gpa; and a Durometer Hardness (Type A)=39-42.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 9.5-12.2, preferably between 10.0-10.5, and most preferably at 10.2, and the viscosity of the mixture is at about 5500-10000 cps (centipose) or more preferably at about 7500-8000 cps, a 10% solution of hexamethyl disilazane (HMDZ) in hexane (99% assay) is added thereto at ambient temperature, e.g., 72±5° F. (22.2°±2.8° C.). It is important to ensure that the weight of the HMDZ is 10% of the initial weight of the precursor solution. The combined mixture is continued to be mixed for about 20±4 minutes and then aged for a period of 8-12 hours, after which, the HMDZ solution in hexane is discharged and then a second wash takes place by adding the hexane to the washed aerogel. The second wash takes a period of 8-12 hours at ambient temperature, e.g., 72±5° F. (22.2°±2.8° C.). The hexane wash solution is then discharged. The washed gel (e.g., alcogel) is then dried at a temperature of about 150° F. (65.6° C.) for about 6 hours, followed by drying at a temperature of about 220° F. (104.4° C.) for 6 hours, followed by drying (e.g., annealing of the aerogel) at a temperature of about 392° F. (200° C.) for up to six (6) hours, e.g., typically between about 0.5-2 hours. The dried product is collected and screened, per the specific requirements, to obtain the final nanogel.

EXAMPLE 4

A. Preparation of Precursor Solution

Wt. of chilled (i.e., 20° F. to 43° F. (−6.7°-6.1° C.)) alkoxide=100 grams

Wt. of chilled (i.e., 20° F. to 43° F. (−6.7°-6.1° C.)) absolute EtOH=80 grams

Wt. of chilled (i.e., 20° F. to 43° F. (−6.7°-6.1° C.)) carbamaldehyde=100 grams

B. Preparation of Catalyst Solution

Wt. of chilled (i.e., 20° F. to 43° F. (−6.7°-6.1° C.)) absolute EtOH=56 grams

Wt. of chilled 34° F. to 43° F. (1.1°-6.1° C.) de-ionized water=150 grams

Wt. chilled (i.e., 20° F. to 43° F. (−6.7°-6.1° C.)) of ammonium hydroxide=1.79 grams (for a final pH=12.20 or gamma-APTES=1.20 grams) with the catalyst solution having a temperature of between 34° F. to 43° F. (1.1°-6.1° C.) so as to prevent crystallization or freezing of the water within the solution. The final aerogel properties are C=0.0035 $\mu m^4$/cm; Light Scattering Coefficient A=0.833 Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.061 g/cc; a Bulk Modulus of Elasticity=0.53 Gpa; and a Durometer Hardness (Type A)=39-45.

Slowly, the catalyst solution is added to the precursor solution while the precursor solution is being constantly mixed.

Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 9.5-12.2, preferably between 10.0-10.5, and most preferably at 10.2, and the viscosity of the mixture is at about 5500-10000 cps (centipose) or more preferably at about 7500-8000 cps, a 10% solution of hexamethyl disilazane (HMDZ) in hexane (99% assay) is added thereto at ambient temperature, e.g., 72±5° F. (22.2°±2.8° C.). It is important to ensure that the weight of the HMDZ is 10% of the initial weight of the precursor solution. The combined mixture is continued to be mixed for about 15 minutes and then aged for a period of 8-12 hours, after which, the solution is discharged. The washed gel (e.g., alcogel) is then dried at a temperature of about 150° F. (65.6° C.) for about 6 hours, followed by drying at a temperature of about 220° F. (104.4° C.) for 6 hours, followed by drying (e.g., annealing of the aerogel) at a temperature of about 392° F. (200° C.) for up to 6 hours, e.g., typically between about 0.5-2 hours. The dried product is collected and screened, per the specific requirements, to obtain the final nanogel.

EXAMPLE 5

A. Preparation of Precursor Solution

Wt. of chilled (i.e., 20° F. to 43° F. (−6.7°-6.1° C.)) alkoxide=100 grams

Wt. of chilled (i.e., 20° F. to 43° F. (−6.7°-6.1° C.)) carbamaldehyde=100 grams B. Preparation of Catalyst Solution Wt. of chilled (i.e., 20° F. to 43° F. (−6.7°-6.1° C.)) absolute EtOH=56 grams Wt. of chilled (34° F. to 43° F. (1.1°-6.1° C.)) de-ionized water=150 grams Wt. chilled (i.e., 20° F. to 43° F. (−6.7°-6.1° C.)) of ammonium hydroxide=1.79 grams (for a final pH=12.20 or gamma-APTES=1.20 grams) with the catalyst solution having a temperature of between 34° F. to 43° F. (1.1°-6.1° C.) so as to prevent crystallization or freezing of the water within the solution. The final aerogel properties are C=0.0035 $\mu m^4/cm$; Light Scattering Coefficient A=0.833; Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.061 g/cc; a Bulk Modulus of Elasticity=0.53 Gpa; and a Durometer Hardness (Type A)=39-45.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 9.5-12.2, preferably between 10.0-10.5, and most preferably at 10.2, and the viscosity of the mixture is at about 5500-10000 cps (centipose) or more preferably at about 7500-8000 cps, a 10% solution of hexamethyl disilazane (HMDZ) in hexane (99% assay) is added thereto at ambient temperature, e.g., 72±5° F. (22.2°±2.8° C.). It is important to ensure that the weight of the HMDZ is 10% of the initial weight of the precursor solution. The combined mixture is continued to be mixed for about 15 minutes, after which, the solution is discharged. The washed gel (e.g., alcogel) is then dried at a temperature of about 150° F. (65.6° C.) for about 6 hours, followed by drying at a temperature of about 220° F. (104.4° C.) for 6 hours, followed by drying (e.g., annealing of the aerogel) at a temperature of about 392° F. (200° C.) for up to 6 hours, e.g., typically between about 0.5-2 hours. The dried product is collected and screened, per the specific requirements, to obtain the final nanogel.

EXAMPLE 6

A. Preparation of Precursor Solution

Wt. of chilled (i.e., 20° F. to 43° F. (−6.7°-6.1° C.)) alkoxide=100 grams

Wt. of chilled (i.e., 20° F. to 43° F. (−6.7°-6.1° C.)) DAA=80 grams

Wt. of chilled (i.e., 20° F. to 43° F. (−6.7°-6.1° C.)) carbamaldehyde=100 grams B. Preparation of Catalyst Solution Wt. of chilled (i.e., 20° F. to 43° F. (−6.7°-6.1° C.)) DAA=56 grams Wt. of chilled (32° F. to 43° F. (0°-6.1° C.)) de-ionized water=150 grams Wt. of chilled (i.e., 20° F. to 43° F. (−6.7°-6.1° C.)) ammonium hydroxide=2.23 grams (for a final pH=12.20 or gamma-APTES=1.77 grams) with the catalyst solution having a temperature of between 34° F. to 43° F. (1.1°-6.1° C.) so as to prevent crystallization or freezing of the water within the solution. The final aerogel properties are C=0.0035 $\mu m^4/cm$; Light Scattering Coefficient A=0.833; Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.061 g/cc; a Bulk Modulus of Elasticity=0.53 Gpa; and a Durometer Hardness (Type A)=39-45.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 9.5-12.2, preferably between 10.0-10.5, and most preferably at 10.2, and the viscosity of the mixture is at about 5500-10000 cps (centipose) or more preferably at about 7500-8000 cps, a 10% solution of hexamethyl disilazane (HMDZ) in hexane (99% assay) is added thereto at ambient temperature, e.g., 72±5° F. (22.2°±2.8° C.). It is important to ensure that the weight of the HMDZ is 10% of the initial weight of the precursor solution. The combined mixture is continued to be mixed for about 15 minutes, after which, the solution is discharged. The washed gel (e.g., alcogel) is then dried at a temperature of about 150° F. (65.6° C.) for about 6 hours, followed by drying at a temperature of about 220° F. (104.4° C.) for 6 hours, followed by drying (e.g., annealing of the aerogel) at a temperature of about 392° F. (200° C.) for up to 6 hours, e.g., typically between about 0.5-2 hours. The dried product is collected and screened, per the specific requirements, to obtain the final nanogel.

EXAMPLE 7

A. Preparation of Precursor Solution

Wt. of chilled (i.e., 20° F. to 43° F. (−6.7°-6.1° C.)) alkoxide=47 grams
Wt. of chilled (i.e., 20° F. to 43° F. (−6.7°-6.1° C.)) EtOH=243 grams B. Preparation of Catalyst Solution Wt. of chilled (i.e., 20° F. to 43° F. (−6.7°-6.1° C.)) EtOH=400 grams
Wt. of chilled 32° F. to 43° F. (0°-6.1° C.) de-ionized water=32.9 grams
Wt. of chilled (i.e., 20° F. to 43° F. (−6.7°-6.1° C.)) ammonium hydroxide=8.64 grams (for final pH=10.9-11.9) with the catalyst solution having a temperature of between 34° F. to 43° F. (1.1°-6.1° C.) so as to prevent crystallization or freezing of the water within the solution. The final aerogel properties are C=0.0035 $\mu m^4$/cm; Light Scattering Coefficient A=0.833; Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.061 g/cc; a Bulk Modulus of Elasticity=0.53 Gpa; and a Durometer Hardness (Type A)=39-45.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 10.9-11.9 and the viscosity of the mixture is at about 5500-10000 cps (centipose) or more preferably at about 7500-8000 cps, a 10% solution of hexamethyl disilazane (HMDZ) in hexane (99% assay) is added thereto at ambient temperature, e.g., 72±5° F. (22.2°±2.8° C.). It is important to ensure that the weight of the HMDZ is 10% of the initial weight of the precursor solution. The combined mixture is aged for a period of 8-12 hour, after which, the HMDZ solution is discharged. The washed gel (e.g., alcogel) is then dried at a temperature of about 150° F. (65.6° C.) for about 6 hours, followed by drying at a temperature of about 220° F. (104.4° C.) for 1-6 hours, followed by drying (e.g., annealing of the aerogel) at a temperature of about 300° F. (148.9° C.) for one 1-6 hours. The dried product is collected and screened, per the specific requirements, to obtain the final nanogel.

EXAMPLE 8

A. Preparation of Precursor Solution

Wt. of chilled (i.e., 20° F. to 43° F. (−6.7°-6.1° C.)) alkoxide=47 grams
Wt. of chilled (i.e., 20° F. to 43° F. (−6.7°-6.1° C.)) EtOH=243 grams
Wt. of chilled (i.e., 20° F. to 43° F. (−6.7°-6.1° C.)) carbamaldehyde=47 grams B. Preparation of Catalyst Solution Wt. of chilled (i.e., 20° F. to 43° F. (−6.7°-6.1° C.)) EtOH=400 grams
Wt. of chilled (i.e., 32° F. to 43° F. (0°-6.1° C.) de-ionized water=32.9 grams
Wt. of chilled (i.e., 20° F. to 43° F. (−6.7°-6.1° C.)) ammonium hydroxide=8.64 grams (for a final pH—11.2) with the catalyst solution having a temperature of between 34° F. to 43° F. (1.1°-6.1° C.) so as to prevent crystallization or freezing of the water within the solution. The final aerogel properties are C=0.0035 $\mu m^4$/cm; Light Scattering Coefficient A=0.833; Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.061 g/cc; a Bulk Modulus of Elasticity=0.53 Gpa; and a Durometer Hardness (Type A)=39-45.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 9.5-11.2 and the viscosity of the mixture is at about 5500-10000 cps (centipose) or more preferably at about 7500-8000 cps, a 10% solution of hexamethyl disilazane (HMDZ) in carbamaldehyde (99% assay) is added thereto at ambient temperature, e.g., 72±5° F. (22.2°±2.8° C.). It is important to ensure that the weight of the HMDZ is 10% of the initial weight of the precursor solution. The combined mixture is aged for a period of 8-12 hours, after which, the HMDZ solution is discharged. The washed gel (e.g., alcogel) is then dried at a temperature of about 150° F. (65.6° C.) for about 1-6 hours, followed by drying at a temperature of about 220° F. (104.4° C.) for one 1-6 hours, followed by drying (e.g., annealing of the aerogel) at a temperature of about 300° F. (148.9° C.) for 2-8 hours. The dried product is collected and screened, per the specific requirements, to obtain the final nanogel.

EXAMPLE 9

A. Preparation of Precursor Solution

Wt. of chilled (i.e., 20° F. to 43° F. (−6.7°-6.1° C.)) alkoxide=47 grams
Wt. of chilled (i.e., 20° F. to 43° F. (−6.7°-6.1° C.)) carbamaldehyde=47 grams

B. Preparation of Catalyst Solution

Wt. of chilled (i.e., 20° F. to 43° F. (−6.7°-6.1° C.)) carbamaldehyde=53 grams

Wt. of chilled (i.e., 20° F. to 43° F. (−6.7°-6.1° C.)) deionized water=32.9 grams Wt. of chilled (i.e., 20° F. to 43° F. (−6.7°-6.1° C.)) ammonium hydroxide=8.64 grams (for final pH=10.5-12.20) with the catalyst solution having a temperature of between 34° F. to 43° F. (1.1°-6.1° C.) so as to prevent crystallization or freezing of the water within the solution. The final aerogel properties are C=0.0035 µm$^4$/cm; Light Scattering Coefficient A=0.833; Light transmission (% LT) of 41% for Artificial Light, 25-27% for Blue Sky, 25-27% for Artificial Light passing through a Kalwall Panel incorporating the inventive aerogel, and 19-20% for Blue Sky Day passing through a Kalwall Panel incorporating the inventive aerogel; Density of 0.044-0.061 g/cc; a Bulk Modulus of Elasticity=0.53 Gpa; and a Durometer Hardness (Type A)=39-45.

Slowly, the catalyst solution is added to the precursor solution while the precursor solution is being constantly mixed. Mixing of the solutions with one another to form a mixed solution and continue mixing the mixed solution while the pH is periodically checked in order to maintain the pH between 9.5-12.2 and thereby control the particle size distribution of the resulting aerogel. It is to be appreciated that the pH of the mixture will generally be reduced slightly as the catalyst solution is mixed with the precursor solution. As noted above, either an acid or ammonium hydroxide can be added to maintain the pH within the desired range. Once the pH for the mixture is between 10.5-12.2 and the viscosity of the mixture is at about 5500-10000 cps (centipose) or more preferably at about 7500-8000 cps, a 10% solution of hexamethyl disilazane (HMDZ) in carbamaldehyde (99% assay) is added thereto at ambient temperature, e.g., 72±5° F. (22.2°±2.8° C.). It is important to ensure that the weight of the HMDZ is 10% of the initial weight of the precursor solution. The combined mixture is aged for a period of 8-12 hours, after which, the HMDZ solution is discharged. The washed gel (e.g., alcogel) is then dried at a temperature of about 150° F. (65.6° C.) for about 1-8 hours, followed by drying at a temperature of about 220° F. (104.4° C.) for two 2-8 hours, followed by drying (e.g., annealing of the aerogel) at a temperature of about 300° F. (148.9° C.) for 2-8 hours. The dried product is collected and screened, per the specific requirements, to obtain the final nanogel.

With reference now to FIG. 11, one application of the aerogel product, according to the present invention, will now be discussed. As can be seen in this Figure, the aerogel is used as an insulating material to form an insulating panel. The insulating panel 50 generally comprises a perimeter top and bottom walls 52, 54 interconnected with one another by a pair of opposed side walls 56, 58 which are typically is manufactured from a material which has relatively low thermal conductivity and so as to be a desirable insulating material. The top, bottom and side walls 52, 54, 56, 58 support and space apart a pair of opposed transparent or translucent panels 60, 62, e.g., a plastic panel or some other transparent panel. The pair of opposed glass panels 60, 62, together with the top, bottom and side walls 52, 54, 56, 58, form an enclosed internal chamber 64 which has an interior volume which accommodates a suitable quantity of aerogel 68 material to provide a desire insulating R value which still remaining relatively transparent/translucent following filling of the internal volume with the aerogel. Typically, one of the top, bottom and side walls 52, 54, 56, 58 is provided with an opening to facilitate filling of the internal volume of the insulating panel 50 with the aerogel and this opening is covered by a cover 66, after sufficient filling with the aerogel, to seal the aerogel therein.

The aerogel is located between the spaced apart panels 60, 62 and is typically in granular form. Due to the relatively high R-value of the aerogel, e.g., an R-value of at least 21, for example, it is suitable for use as an insulating material and minimizes the heat transfer from the first panel 60 to the second opposed panel 62 while still allowing a light to pass readily through both panels 60, 62 into a room or structure incorporating such an insulating panel 50 as a barrier to the exterior environment.

The inventor believes that the most important factors in obtaining a desired areogel, having superior light transmission characteristics, low density and a high insulating R value, are to utilize raw materials which are relatively pure, e.g., the catalyst has to at least be an industrial grade and the precursor must only contain a very small amount of impurities, i.e., a few parts per million, because any trace amounts of sodium within either solution has a tendency to oxidize or otherwise react in any undesired fashion during manufacture of the aerogel. It is also important to maintain the pH of the reacting raw materials generally in the range of about 9.5-12.2. The temperature at which the raw materials react as well as the time period during which the material react are also very important. The vibration process is also important in helping remove any water from the pore structure and replacing the water with a solvent which can be subsequently removed during the drying process without any significant damage or shrinkage occurring to the pore structure.

The washing process, according to the present invention, is directed at displacing the water contained within the pore structure with a solvent, such as pentane or heptane, which is insoluble in water and has a low surface energy. Such solvent is useful in drawing and/or removing the water out of the pores by a conventional diffusion process. The solvent is relatively easily removed subsequently, during the drying process, without causing significant collapse or damage to the pore structure. To increase the efficiency of the washing process, the aerogel is preferably broken into smaller particles and these smaller aerogel particles are vibrated at an ultrasonic high frequency, during the washing process, to enhance the diffusion process.

The drying process typically employs a vacuum dryer, which removes the low surface tension solvent from the nanopores of the aerogel. The walls of the nanoporous silica gel are typically elastic and flexible and therefore when the solvent evaporates, i.e., exits or leaving the pores, the solvent molecules have a tendency to leave a void which otherwise (if a low surface tension solvent is not utilized) may lead to the collapse of the pores. The drying process generally occurs at a temperature of about 120°-250° F. (48.9°-121.1° C.).

Once substantially all of the solvent is removed from the nanopores, while minimizing collapse of the nanopores, the structure is then annealed by heating the pores structure at an elevated temperature in the range of 250°-392° F. (121.1°-200° C.), where the structure of the pores become hard and rigid.

The aerogel product, according to the present invention, has a relatively high R value, e.g., an R value in the range of 21-31 and more preferably an R value of about 25-30, a relatively high light transmission characteristics in the range of 24-26% and also has a relatively high density of around 0.0085 to 0.0112 g/cc). In addition, the aerogel product is inert and will not react with any element, compound or water and will typically not degrade when exposed to light, high temperature, etc. That is, the aerogel product will not deteriorate, fall apart or have any significant reduction in the optical clarity of the areogel.

The inventor has discovered that use of cold or chilled raw materials enhances the self-assembly of the nanogel. This self-assembly takes place in almost all nanogels at a variety of different temperatures. However, self-assembly, associated with a controlled pore size for both the primary and the secondary nanoparticles, is achieved more effectively at a lower temperature 34° F. to 43° F. (1.1°-6.1° C.). By controlling the particle size, e.g., controlling the nanoparticle size distribution to be in the range of about 5 to about 30 nm, more preferably within the range of about 15±5 nm, and by controlling the above noted characteristics, a unique product, e.g., a Kalgel aerogel, is obtained which has a low density (around 0.0035 g/cc), high R value (in the range of 35-40) and high optical clarity (in the range of 0.001-0.003).

Similarly, precise control of the pH as results in an improved areogel product. The inventor discovered that by controlling the pH of the reacting raw materials, within a very tight pH range of from 9.5-12.2, in turn leads to a controlled self-assembly for both the primary and the secondary nanoparticles of the gel (e.g., sol gel). Precise and careful control of the pH results in a final aerogel which higher structural integrity, higher optical clarity (thermal stress during heating is easily endured and thus collapse of the pore structure is avoided). The inventor determined that if the pH is too high, e.g., over 12.2, the gel process and self-assembly occurs too slowly and the particle size distribution is not precisely controlled. Conversely, if the pH is too low, e.g., below 9.5, the gel process and self-assembly occurs too quickly and the particle size distribution is again not precisely controlled.

The acoustical and optical vibration techniques, are utilized during the final stages of the self-assembly of the (sol) gel. The final stages of the self-assembly of the gel (e.g., sol gel) is important because it leads to a silica nanogel with high mechanical integrity, low friability, very low density and thus very high R value. Such high R value is very useful in employing the aerogel as an insulating material for a variety of different applications.

Preferably the catalyst solution comprises a solution of one or more of an acetyl acetonate-based catalyst, gamma-aminopropyl triethoxy silane, de-ionized water, ethanol (absolute), diacetone alcohol (DAA), carbamaldehyde, de-ionized carbamaldehyde and ammonium hydroxide and mixtures thereof; the precursor solution comprising a solution of one or more of alkoxide, ethanol (absolute), diacetone alcohol (DAA), carbamaldehyde, de-ionized carbamaldehyde and mixtures thereof.

Since certain changes may be made in the above described improved aerogel, without departing from the spirit and scope of the invention herein involved, it is intended that all of the subject matter of the above description or shown in the accompanying drawings shall be interpreted merely as examples illustrating the inventive concept herein and shall not be construed as limiting the invention.

I claim:

1. A method of manufacturing a silica aerogel, the method comprising the steps of:
   a) preparing a precursor solution chilled to a temperature of between 20°-60° F. (−6.7°-15.5° C.);
   b) preparing a catalyst solution chilled to a temperature of between 20°-60° F. (−6.7°-15.5° C.);
   c) mixing the chilled catalyst solution with the chilled precursor solution to form a mixed solution with the mixed solution having a pH of between 9.5 and 12.2;
   d) aging the mixed solution for a time of between 1 and 120 minutes, to form a gel and control a particle size distribution of the gel while maintaining the mixed solution at a temperature of between 34°-55° F. (1.1°-12.8° C.);
   e) immediately upon the mixed solution reaching a gel point at which a viscosity of the mixed solution increases to between about 5500 to about 10000 centipose, silating the gel; and
   f) drying the gel at a temperature of at least 122° F. (50° C.) to form the aerogel.

2. The method according to claim 1, further comprising the step of selecting as the catalyst solution from one or more of an acetyl acetonate-based catalyst, gamma-aminopropyl triethoxy silane, de-ionized water, ethanol (absolute), diacetone alcohol (DAA), carbamaldehyde, de-ionized carbamaldehyde and ammonium hydroxide and mixtures thereof.

3. The method according to claim 1, further comprising the step of forming the precursor solution from the group consisting of alkoxide, ethanol (absolute), diacetone alcohol (DAA), carbamaldehyde, de-ionized carbamaldehyde and mixtures thereof.

4. The method according to claim 2, further comprising the step of forming the precursor solution from the group consisting of alkoxide, ethanol (absolute), diacetone alcohol (DAA), carbamaldehyde, de-ionized carbamaldehyde and mixtures thereof.

5. The method according to claim 1, further comprising the step of forming the precursor solution from an alkoxide selected from the group consisting of pre-condensed tetraethyl orthosilicate (TEOS), condensed tetraethyl orthosilicate (TEOS), tetramethoxysilane (TMOS), tetra-n-propoxysilane, and mixtures thereof
   mixed with at least one other solution selected from the group consisting of ethanol (absolute), diacetone alcohol (DAA), carbamaldehyde, de-ionized carbamaldehyde and mixtures thereof to form the precursor solution.

6. The method according to claim 1, further comprising the step of, following silation of the gel, drying the gel in one of an oven, under a vacuum, and in a fluid bed drier, at ambient pressure, to form the aerogel.

7. The method according to claim 1, further comprising the step of performing all of the method steps at ambient pressure.

8. The method according to claim 1, further comprising the step of silating the gel with a hexamethyl disilazane (HDMZ) solution to render the gel hydrophobic.

9. The method according to claim 1, further comprising the step of:
   forming the precursor solution from one of absolute ethanol (EtOH) and diacetone alcohol (DAA) and an alkoxide selected from at least one of tetramethyl orthosilicate (TMOS) and tetraethyl orthosilicate (TEOS); and
   forming the catalyst solution from one of absolute ethanol (EtOH) and diacetone alcohol (DAA) and at least one of ammonium hydroxide and gamma-aminopropyl triethoxy silane (gamma-APTES);
   wherein at least one of the precursor solution and the catalyst solution includes a diacetone alcohol solvent as a replacement for water as a hydrolyzing media for the alkoxide precursors, whereby
   alcohol is a primary reaction byproduct of gel formation, and
   the method further comprises a pre-drying step of washing the gel with a wash fluid selected from a group consisting of ketone, ether, alkane, chloroalkane, hexane and hexamethyl disiloxane to remove the alcohol by product.

10. The method according to claim 1, further comprising the step of silating the gel with a 10% solution of hexamethyl disilazane (HMDZ).

11. The method according to claim 9, further comprising the step of silating the gel with a solution formed from the group consisting of heptane, hexane, and a higher alkane mixed with a 20% solution of hexamethyl disiloxane (HMDS) and mixtures thereof.

12. The method according to claim 1, further comprising the step of silating the gel at a temperature of between 34°-55° F. (1.1°-12.8° C.).

13. The method of manufacturing a silica aerogel according to claim 1, further comprising the step of:
drying the gel at ambient pressure.

14. The method according to claim 6 further comprising the steps initially drying the gel at a temperature of about 150° F. (65.6° C.) for about 1-8 hours, followed by drying the gel at a temperature of about 220° F. (104.4° C.) for 1-8 hours.

15. The method according to claim 14, further comprising the step of finally drying at a temperature of at least 300° F. (148.9° C.) for about 0.5-8 hours to anneal the aerogel.

16. The method according to claim 1, further comprising the steps of:
washing the gel with a first wash fluid for about 20±4 hours with the first wash fluid being selected from the group consisting of ketone, ether, alkane, chloroalkane, hexane, acetone, heptane, and hexamethyl disiloxane;
discharging the first wash fluid;
washing the gel in second wash fluid for about 20±4 hours with the second wash fluid being selected from selected from the group consisting of ketone, ether, alkane, chloroalkane, hexane, acetone, heptane, and hexamethyl disiloxane; and
discharging the second wash fluid.

17. The method according to claim 16, further comprising the step of vibrating the gel with ultrasonic waves at an ultrasonic high frequency while the gel is washed with at least one of the first and the second wash fluids to enhance diffusion and displace any water contained within a pore structure with a solvent from at least one of the first and the second wash fluids which is insoluble in water.

18. The method according to claim 17, further comprising the step of generating the ultrasonic waves by one of an electromechanical sine wave generating device and a saw-tooth wave generating device.

19. The method according to claim 17, further comprising the step of removing the solvent contained within the pore structure while drying the gel at ambient pressure and at an initial drying temperature of about 122° F. (50° C.).

20. A method of manufacturing a silica aerogel, the method comprising the steps of:
a) preparing a precursor solution chilled to a temperature of between 20°-60° F. (−6.7°-15.5° C.);
b) preparing a catalyst solution chilled to a temperature of between 20°-60° F. (−6.7°-15.5° C.);
c) mixing the chilled catalyst solution with the chilled precursor solution to form a mixed solution with the mixed solution having a pH of between 9.5 and 12.2;
d) aging the mixed solution for a time of between 1 and 120 minutes, to form a gel and control a particle size distribution of the gel while maintaining the mixed solution at a temperature of between 34°-55° F. (1.1°-12.8° C.);
e) immediately upon the mixed solution reaching a gel point at which a viscosity of the solution increases to between about 5500 to about 10000 centipose, silating the gel; and
f) drying the gel at a temperature of at least 122° F. (50° C.) to form the aerogel;
forming the precursor solution from
one of carbamaldehyde and an alkoxide selected from at least one of tetramethyl orthosilicate (TMOS) and tetraethyl orthosilicate (TEOS), and
one of absolute ethanol (EtOH) and diacetone alcohol (DAA); and
forming the catalyst solution from
at least one of ammonium hydroxide and gamma-aminopropyl triethoxy silane (gamma-APTES), and
one of carbamaldehyde, absolute ethanol (EtOH) and diacetone alcohol (DAA), whereby
an inclusion of carbamaldehyde, in at least one of the precursor solution and the catalyst solution reduces thermal stress in the aerogel so that the method proceeds directly from the silating step to the drying step without an intermediate washing step for removing water from pores of the gel.

* * * * *